(12) United States Patent
Zhang et al.

(10) Patent No.: US 7,400,351 B2
(45) Date of Patent: Jul. 15, 2008

(54) CREATION OF IMAGE BASED VIDEO USING STEP-IMAGES

(75) Inventors: Dongmei Zhang, Redmond, WA (US); Mehul Y Shah, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 808 days.

(21) Appl. No.: 10/959,385

(22) Filed: Oct. 6, 2004

(65) Prior Publication Data
US 2006/0072017 A1    Apr. 6, 2006

(51) Int. Cl.
*H04N 5/262* (2006.01)
(52) U.S. Cl. .................. 348/240.99; 348/155
(58) Field of Classification Search ............ 348/14.14, 348/14.15, 155, 240.99; 375/240.16, 240.17
See application file for complete search history.

(56) References Cited

U.S. PATENT DOCUMENTS

| | | | |
|---|---|---|---|
| 4,864,516 A | 9/1989 | Gaither et al. | |
| 4,974,178 A | 11/1990 | Izeki et al. | |
| 5,760,788 A | 6/1998 | Chainini et al. | |
| 5,973,755 A | 10/1999 | Gabriel | |
| 6,040,861 A | 3/2000 | Boroczky et al. | |
| 6,072,480 A | 6/2000 | Gorbet et al. | |
| 6,084,590 A | 7/2000 | Robotham et al. | |
| 6,097,757 A | 8/2000 | Boice et al. | |
| 6,108,001 A | 8/2000 | Tuttle | |
| 6,121,963 A | 9/2000 | Ange | |
| 6,222,883 B1 | 4/2001 | Murdock et al. | |
| 6,278,466 B1 * | 8/2001 | Chen .......................... | 345/473 |
| 6,333,753 B1 | 12/2001 | Hinckley | |
| 6,362,850 B1 * | 3/2002 | Alsing et al. ................ | 348/239 |
| 6,369,835 B1 | 4/2002 | Lin | |
| 6,469,711 B2 | 10/2002 | Foreman et al. | |
| 6,480,191 B1 | 11/2002 | Balabanovic | |
| 6,546,405 B2 | 4/2003 | Gupta et al. | |

(Continued)

FOREIGN PATENT DOCUMENTS

EP    1126721    4/2004

(Continued)

OTHER PUBLICATIONS

U.S. Appl. No. 10/924,383, filed Aug. 23, 2004, Shah, et al.

(Continued)

*Primary Examiner*—Tuan V Ho
*Assistant Examiner*—Dennis Hogue
(74) *Attorney, Agent, or Firm*—Amin, Turocy & Calvin, LLP

(57) ABSTRACT

The subject invention provides a system and/or method that facilitates encoding a source image associated with a motion vector by employing at least one step image, wherein such step image provides a reduction in the amount of stored video. A step image component determines the maximum step image size and appropriate number of step images to simulate a smooth motion based upon an input component receiving data such as, but not limited to, a motion parameter and a computer environment parameter. Moreover, the step image component can utilize a motion controller component that facilitates the visual perception of smooth video during a zoom motion. Additionally, the step image component can utilize an encoder component providing specialized techniques in encoding with step images.

17 Claims, 16 Drawing Sheets

U.S. PATENT DOCUMENTS

| | | | |
|---|---|---|---|
| 6,587,119 B1 * | 7/2003 | Anderson et al. | 345/672 |
| 6,597,375 B1 | 7/2003 | Yawitz | |
| 6,624,826 B1 | 9/2003 | Balabanovic | |
| 6,628,303 B1 | 9/2003 | Foreman et al. | |
| 6,654,029 B1 | 11/2003 | Chiu et al. | |
| 6,665,835 B1 | 12/2003 | Gutfreund et al. | |
| 6,686,970 B1 | 2/2004 | Windle | |
| 6,708,217 B1 | 3/2004 | Colson et al. | |
| 6,763,175 B1 | 7/2004 | Trottier et al. | |
| 6,803,925 B2 | 10/2004 | Vronay | |
| 6,823,013 B1 | 11/2004 | Boice et al. | |
| 7,073,127 B2 | 7/2006 | Zhao et al. | |
| 7,240,297 B1 | 7/2007 | Anderson et al. | |
| 2001/0040592 A1 | 11/2001 | Foreman et al. | |
| 2002/0057348 A1 * | 5/2002 | Miura et al. | 348/211 |
| 2002/0065635 A1 | 5/2002 | Lei et al. | |
| 2002/0109712 A1 | 8/2002 | Yacovone et al. | |
| 2002/0118287 A1 * | 8/2002 | Grosvenor et al. | 348/222.1 |
| 2002/0156702 A1 | 10/2002 | Kane | |
| 2003/0085913 A1 | 5/2003 | Ahmad et al. | |
| 2003/0189580 A1 * | 10/2003 | Cheng | 345/660 |
| 2004/0017390 A1 | 1/2004 | Knowlton et al. | |
| 2004/0017508 A1 | 1/2004 | Huang | |
| 2004/0056882 A1 | 3/2004 | Foreman et al. | |
| 2004/0066395 A1 | 4/2004 | Foreman et al. | |
| 2004/0071441 A1 | 4/2004 | Foreman et al. | |
| 2004/0095379 A1 | 5/2004 | Chang et al. | |
| 2004/0130566 A1 | 7/2004 | Bannerjee et al. | |
| 2004/0199866 A1 | 10/2004 | Deshpande | |
| 2005/0034077 A1 | 2/2005 | Jaeger | |
| 2005/0042591 A1 | 2/2005 | Bloom et al. | |
| 2005/0132284 A1 | 6/2005 | Lloyd et al. | |
| 2005/0138559 A1 | 6/2005 | Santos-Gomez et al. | |
| 2006/0041632 A1 | 2/2006 | Shah et al. | |
| 2006/0072017 A1 | 4/2006 | Zhang et al. | |
| 2006/0188173 A1 | 8/2006 | Zhang et al. | |
| 2006/0203199 A1 | 9/2006 | Shah et al. | |
| 2006/0204214 A1 | 9/2006 | Shah et al. | |
| 2006/0218488 A1 | 9/2006 | Shah et al. | |
| 2006/0224778 A1 | 10/2006 | Shah et al. | |

FOREIGN PATENT DOCUMENTS

| | | | |
|---|---|---|---|
| EP | 1443420 | | 8/2004 |
| GB | 2388241 | | 11/2003 |
| JP | 11205786 A | * | 7/1999 |
| WO | 2004062260 | | 7/2004 |

OTHER PUBLICATIONS

Apple iMovie, http://www.apple.com/ilife/imovie/, last viewed May 25, 2005.

ImageMatics StillMotion, http://www.imagematics.com/Product/benefits, last viewed May 25, 2005.

ProShow, http://www.photodex.com/products/proshow/, last viewed May 25, 2005.

Moving Picture, http://www.stagetools.com/, last viewed May 25, 2005.

Still Life, http://www.grantedsw.com/still_life/, last viewed May 25, 2005.

DigiRostrum, http://www.lumidium.com/digirostrum.htm, last viewed May 25, 2005.

Pan & Zoom, http://www.applied-magic.com/pdf/panandzoom.pdf, last viewed May 25, 2005.

Dissolve Factory, http://www.buena.com/dissolvefactory.shtml, last viewed May 25, 2005.

Photo Jam, http://www.shockwave.com/sw/content/photojam, last viewed May 25, 2005.

ACDSee, http://www.acdsystems.com/nr/acdsee7/en/homelife/index.html, last viewed May 25, 2005.

Photo Show, http://www.simplestar.com/, last viewed May 25, 2005.

S. Counts and E. Fellheimer. Supporting a Social Presence Through Lightweight Photo Sharing On and Off the Desktop. Proceedings of the 2004 Conference on Human Factors in Computing Systems, pp. 599-606, 2004.

MobileBlogs. 3 pages. Last Viewed on Sep. 9, 2004. http://www.mobileblogs.info.

Blogging goes Mobile. BBC News. 2 pages. Last Updated Feb. 23, 2003. news.bbc.co.uk/1/hi/technology/2783951.stm.

Nokia LifeBlog. 1 page. Last Viewed on Sep. 9, 2004. http://www.nokia.com/nokia/0,,55360,00.html.

PhotoStory. 3 pages. Last Viewed on Sep. 9, 2004. http://www.microsoft.com/PhotoStory.

Blogger. 1 page. Last Viewed on Sep. 9, 2004. http://www.blogger.com.

Jacob Rosenberg, Adobe Premiere Pro 1.5 Studio Techniques, Jun. 28, 2004, Adobe Press, Chapter 1, App. E, App. G.

Matrox releases WYSIWYG output Plug-in for Combustion, http://www.digitalproducer.com/articles/viewarticle.jsp?id=27959, as viewed on Jun. 15, 2005.

Mozilla Foundation Announces More Open, Scriptable Plugins, http://www.mozilla.org/press/mozilla-2004-06-30.html, as viewed on Jun. 15, 2005.

Getting Started with Apple Applications, http://developer.apple.com/referencelibrary/GettingStarted/GS_AppleApplications/, as viewed on Jun. 15, 2005.

Inductive User Interface Guidelines, http://msdn.microsoft.com/library/en-us/dnwui/html/iuiguidelines.asp?frame=true, as viewed on Jun. 14, 2005.

Wizard 97, http://msdn.microsoft.com/library/en-us/wizard/sdkwizv4_7awn.asp?frame=true, last viewed on Jun. 14, 2005.

ACD VideoMagic, http://www.acdsystems.com/English/Products/ACDVideoMagic/index.htm, as viewed on Jun. 15, 2005.

Minos N. Garofalakis, et al., Resource Scheduling for Composite Multimedia Objects, Proceedings of the 24th VLDB Conference, 1998, 12 pages, New York, USA.

Gultekin Ozsoyoglu, et al., Automating the Assembly of Presentations from Multimedia Databases, Case Western Reserve University, 1996, 20 pages, Cleveland, USA.

A. Schodl et al. Video Textures. Proceedings of the 27th Annual Conference on Computer Graphics and Interactive Techniques, pp. 489-498, 2000.

C. Chiang, et al. A New Image Morphing Technique for Smooth Vista Transitions in Panoramic Image-based Virtual Environment. Proceedings of the ACM Symposium on Virtual Reality Software and Technology, pp. 81-90, 1998.

* cited by examiner

Sizes of Motion Rectangles and Step Images

| Rectangle in Source Image | Size (WidthxHeight) | Size of Step Image |
|---|---|---|
| R1 | 2560x1920 | 452x339 |
| R2 | 1810x1357 | 452x339 |
| R3 | 1280x960 | 452x339 |
| R4 | 905x678 | 452x339 |
| R5 | 640x480 | 452x339 |
| R6 | 452x339 | 452x339 |

CREATION OF IMAGE BASED VIDEO USING STEP-IMAGES

TECHNICAL FIELD

The present invention generally relates to computer systems, and more particularly to a system and/or method relating to image-based video that facilitates encoding a source image associated with a motion vector.

BACKGROUND OF THE INVENTION

There is an increasing use of digital photography based upon the decrease in size and cost of digital cameras as well as concurrent increases in availability, usability, and resolution capabilities. Manufacturers and the like have continuously strived to provide smaller electronics in order to satisfy consumer demand, associated with carrying, storing, and using electronic devices. Thus, digital photography has demonstrated growth and has proven to be a profitable market for both electronics and software.

A user first experiences the overwhelming benefits of digital photography upon capturing a digital image. While conventional print photography forces the photographer to wait until development of expensive film to view a print, a digital image in digital photography can be viewed within seconds by utilizing a thumbnail image and/or viewing port on a digital camera. Additionally, images can be deleted or saved based upon user preference, thereby allowing economical use of limited image storage space. In general, digital photography provides a more efficient experience in photography.

Furthermore, editing techniques available for a digital image are vast and numerous with limitations being only the editor's imagination. For example, a digital image can be edited using techniques such as crop, resize, blur, sharpen, contrast, brightness, gamma, transparency, rotate, emboss, texture, draw tools (e.g., fill or pen, add circles, boxes), insert text, etc. In contrast, conventional print photography merely enables the developer to control developing variables such as exposure time, light strength, type of light-sensitive paper, and various light filters. Moreover, such conventional print photography techniques are expensive whereas digital photography software is becoming more common on computers.

In addition to advantages relating to digital photography with respect to image capturing and developing, digital photography facilitates sharing of the taken images. Once captured, images being shared with another can accompany a story (e.g., a verbal narration) and/or physical presentation of such images. Regarding conventional print photographs, sharing options are limited to picture albums, which entail a variety of complications involving organization, storage, and accessibility. Moreover, physical presence of the album is necessary to share print photographs with another.

In view of the above benefits associated with digital photography and traditional deficiencies of print photography, digital images and digital albums correcting such deficiencies have increasingly replaced conventional print photographs and albums. In particular, image-based video provides a convenient and efficient technique for sharing digital images. Image-based video is a slide show of images with motion (e.g., panning, zooming, cross-fading, . . . ) applied to still images. An effect of utilizing image-based video is an enhanced motion video experience that enables details of high-resolution images to be better viewed on a TV screen and/or computer monitor. For example, resolution of a picture taken by a typical 3 MegaPixel digital still camera is about 2000×1500 pixels whereas resolution of a typical computer monitor is 1024×768 pixels. However, with the growing demand of consumers, high-end digital still cameras can provide pictures with much higher resolutions.

Information regarding the image-based video must be saved (e.g., during a creation process and/or at a conclusion) to a file for future playback. In one storage technique, each frame of the video is saved as a picture. However, this technique requires a substantial amount of storage space and CPU (e.g., processor) time in which information relating to the motion can be lost. In yet another more efficient storage technique, a source image and motion vectors associated with an image are encoded (e.g., the source images are encoded to provide better compression). Next, at rendering (e.g., playback) time, each encoded source image and its encoded motion vectors are decoded, allowing the generation of the output video frames.

When creating image-based video, substantial motions (e.g., panning, zooming, cross-fading, etc.) can create various problems in areas such as presentation, resolution, resolution, memory and/or processor capabilities. In any computing environment, hardware and associated components are limited; therefore efficient use is crucial to overall user experience. Substantial panning and/or zooming require a substantial portion of a source image to be encoded in video to enable display of source image content with high fidelity. For example, the size of a high-resolution source image can be m×n in pixels and a motion can be a zoom that alters a view of the source image from the entire image (m×n) to an m/8×n/8 area of such source image. Thereafter, a resulting video can be produced in p×q pixels resolution where m>p>m/8 and n>q>n/8. When fully zoomed, the picture portion of the size m/8×n/8 pixels is displayed, ideally, in the highest fidelity. In order to maintain fidelity, the entire image m×n pixels must be stored.

Based on the previous example, several problems arise during image-based video. Encoding of such a high-resolution source image requires decoding of the source image, which is time consuming to both a user and processor. Once decoded, an uncompressed image requires a substantial amount of memory to adequately store such image. In addition, each frame generated from the source image needs resizing-increasing the processor usage during resizing and rendering. The larger the source image, the higher is the CPU usage during resizing. Furthermore, a typical video system displays at a rate of 30 frames per second, allowing approximately 33 milliseconds for decoding a source image, resizing and rendering each frame to be displayed. If a system does not generate and render a frame within the allotted 33 milliseconds, motion of the video becomes choppy and viewing pleasure is deteriorated. Although processor speeds continue to increase, typical consumer processors and computing environments easily consume over 33 milliseconds when the source image is of high resolution.

In view of the above, there is a need to improve upon and/or provide systems and/or methods relating to image-based video that facilitates encoding a source image associated with a motion vector.

SUMMARY OF THE INVENTION

The following subjects a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that facilitate storing image-based video via employing at least a step image. By utilizing step images, the subject invention drastically reduces an amount of storage and apportioned memory for an image-based video that produces substantial motions such as a zoom, pan, and/or a pan and zoom. The parsing of a substantial motion into smaller motions with step images enables only the step images to be stored into video rather than storing an entire source image.

In accordance with one aspect of the subject invention, a system is provided that employs a step image component to facilitate encoding a source image associated with a motion vector by utilizing at least a step image, wherein such step image provides a reduction in an amount of stored video. The system can determine a maximum step image size and a number of step images to simulate a smooth substantial motion. In order to determine the step characteristics (e.g., the maximum step image size and the number of step images), the step image component uses an input component that receives a motion parameter (e.g., a source image, a pan, a zoom, a pan and zoom, . . . ) and a computer environment parameter (e.g., processor speed, memory capacity, video display, . . . ). With step characteristics determined, the step image component can create the required step images for the motion based at least in part upon the received parameters.

In another aspect of the subject invention, the system includes a motion controller component that mitigates the video visual perception complications during a substantial zoom motion. The motion controller component utilizes a non-linear quadratic function in order to determine appropriate calculations to mitigate visual perception of acceleration and/or deceleration based upon a zoom-in and zoom-out respectively; providing the viewer with a smooth, constant motion.

In yet another aspect of the subject invention, an encoder component facilitates encoding of step images created by the step image component. The encoder component provides different specialized techniques in encoding in order to utilize appropriate sequence of step images to ensure proper decoding of such step images; providing a proper rendering of video. For example, the encoder component can help the decoder determine an appropriate image to cache with a current frame and which image to discard when a new image is decoded. In yet another aspect of the subject invention, the encoder component encodes images in an order based at least in part upon an initial generation of video frames from source images. In addition, the encoder component sets a direction of transition to a newly encoded source image in which a decoder component can accordingly decode.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

Figure 1:
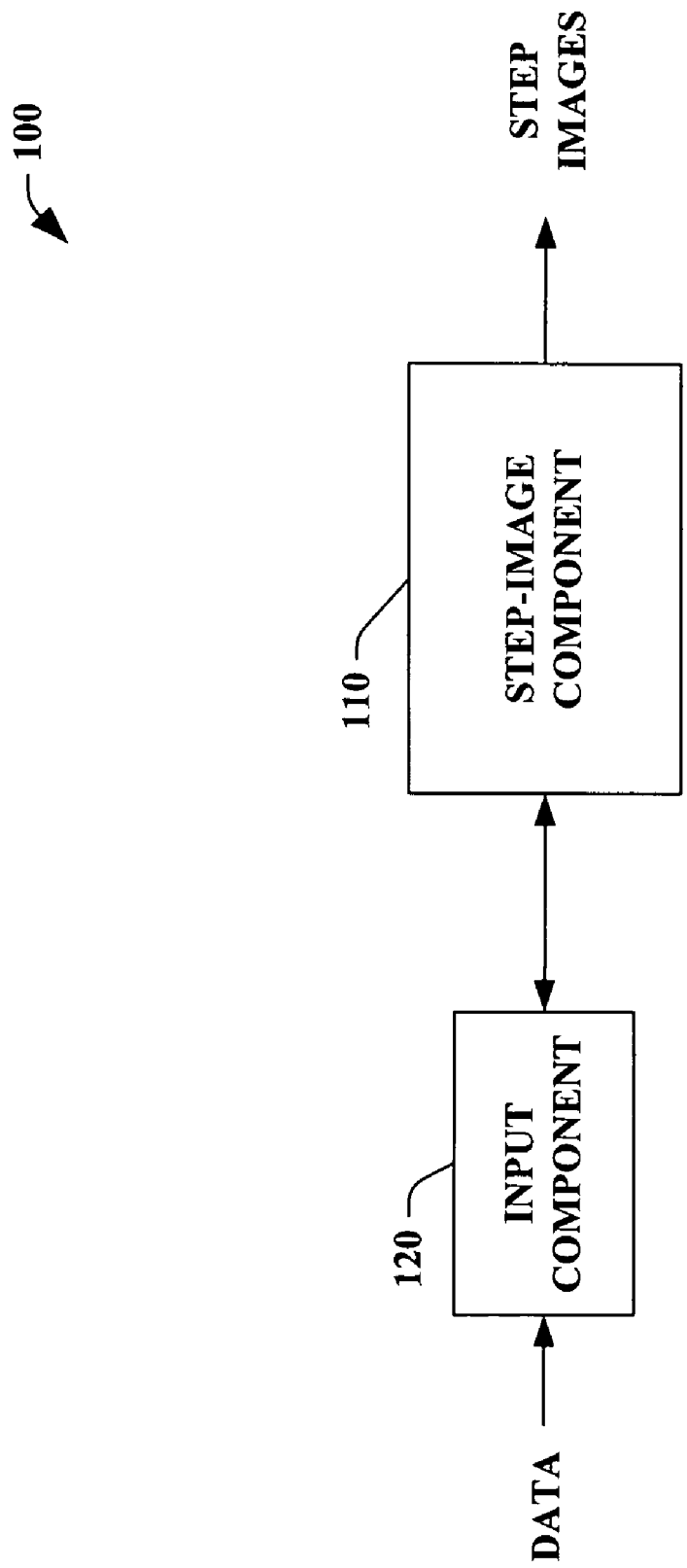
FIG. 1 illustrates a block diagram of an exemplary system that facilitates storing image-based video in accordance with an aspect of the subject invention.

The present invention is described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As utilized in this application, terms "component, system," and the like are intended to refer to a computer-related entity, either hardware, and/or firmware. For example, a component can be, a processor, an object, and/or a computer.

Artificial intelligence based systems (e.g., explicitly and/or implicitly trained classifiers) can be employed in connection with performing inference and/or probabilistic determinations and/or statistical-based determinations as described herein. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Now referring to the figures, FIG. 1 illustrates a system 100 including a step image component 110 that facilitates encoding a source image associated with a motion vector by employing at least one step image, wherein such step image provides a reduction in the amount of stored video. The step image component 110 can determine a maximum step image size and appropriate number of step images to simulate a smooth motion based upon an input component 120 receiving data. The data can be, for example, a motion parameter and a computer environment parameter. The input component 120 receives parameters which can be, but not limited to being, a motion request (e.g., zoom, pan, pan and zoom, . . . ), video display device (e.g., a computer monitor, a television screen, a personal digital assistant (PDA), . . . ), computer environment characteristics (e.g., processor speed, memory, hard disk drive space, video card, motherboard, bus speed, . . . ), and/or a source image (e.g., the image to be utilized with the image-based video). By utilizing step images, the step image component 110 drastically reduces an amount of storage and memory for an image-based video to produce a substantial motion such as, but not limited to, a zoom, pan, or pan and zoom.

For example, one technique to determine a maximum step image size of a step image is to define a threshold. During a playback of image-based video, the computing environment has limited time to decode, generate, and render each frame of video. Typically, time is calculated as 1/framerate (where video is played at a rate of 30 frames per second), which provides approximately 33 milliseconds for the step image to be decoded and the frame to be rendered. Based at least in part upon the CPU (e.g., processor) capability and frame rate, maximum step image size for step images can be determined such that the CPU (e.g., processor) has sufficient time to decode the image and render the video frames. Moreover, a number of step images can be calculated based at least in part upon maximum step image size of such step image and the overall pan/zoom motion in the source image.

Furthermore, the step image component 110 creates the step images utilizing the determined maximum step image size and number of step images based at least upon the motion desired (e.g., zoom, pan, pan and zoom, . . . ), CPU capability, output video resolution and frame rate. The step image component 110 employs step images to represent a source image using a set of smaller images for a motion. In addition, the step image component 110 creates the step images such that each of the smaller images (e.g., step images) is a source image for a portion of the motion in the video and is used to generate video for that portion of motion. Since the step image component 110 creates step images that are individually smaller than the original image and the motion within the step image is correspondingly smaller, memory and processor capabilities are not compromised.

For example, a zoom motion can be initiated upon a source image starting at a full source image and zooming to a rectangular region in center of such source image. The zoom can start at a starting position (R1) and an ending position (R2) such that the starting position is the full image and the ending position is the centered rectangle of the source image. The motion from the start position (R1) and the end position (R2) can be broken down into steps. Once a maximum step image size and number of step images are determined, the step image component can create step images. For this example, motion can be broken into 2 steps. The first step is a motion from R1 to Ri, and a second step is Ri to R2 (where Ri is an intermediate rectangle between R1 and R2, the location being based at least in part upon the number of frames in the video).

Continuing with the previous example, the first step of motion (e.g., R1 to Ri) allows a scaling down of the full image to a smaller size such that Ri has substantially the same resolution (or lower) as that of video to be generated. This scaled-down image can be referred to as Step Image 1. By utilizing Step Image 1, video frames can be generated for motion from R1 to Ri without losing video quality. Similarly, a second step image can be created from the second step of motion (e.g., Ri to R2). During motion from Ri to R2, any portion of image outside rectangle R1 is not needed to generate video frames. Only a portion of the image represented by Ri is to be stored. Furthermore, the image stored can be scaled down such that rectangle R2 has the substantially similar resolution or lower as that of video to be generated. The scaled-down portion of Ri of the image can be referred to as Step Image 2. Step Image 2 is used to generate video frames for motion from Ri to R2 without losing video quality. In the above example, Step Image 1 need not be the same image as the full image because starting motion R1 can be a smaller portion of the full image and also because the portion R1 can be scaled down to an extent wherein the portion Ri has equal or lesser resolution as the output video. Moreover, Step Image 2 need not be the same as rectangle portion Ri. In other words, the source image is scaled down in order to create an image frame and the rule applies when creating such step image.

Figure 2:
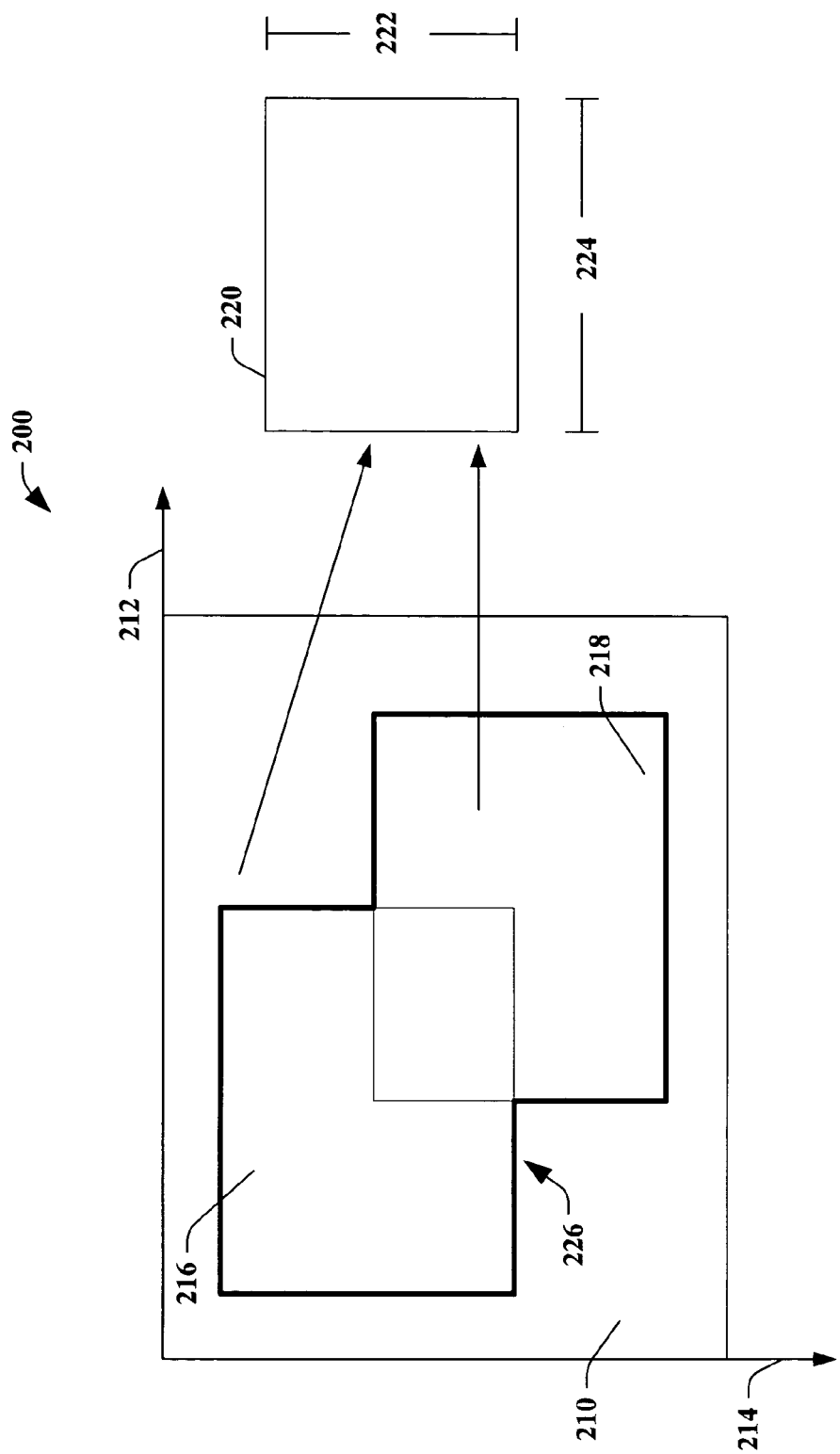
FIG. 2 illustrates a conventional image-based video system.

FIG. 2 illustrates an image-based video system 200 that does not utilize a step image component 110 but rather conventional techniques relating to image-based video. A source image 210 is illustrated, located on an X-axis 212 and a Y-axis 214. A motion commanded from image-based video is illustrated by a start rectangle position 216 toward an end rectangle position 218. In other words, the image-based video pans across the source image 210 creating the illusion of video rather than a conventional slide show. The motion from the start rectangle position 216 to the end rectangle position 218 can be displayed, for example, with a video view port 220 having a height 222, and a width 224. The video port can be, for example, a computer monitor, a television screen, a personal digital assistant (PDA), . . . .

A coordinate system is defined using image coordinates such that, a rectangle (R) inside the source image 210 can be represented as:

$$v=[x0, y0, w, h]^T$$

Where x0 and y0 are coordinates on the X-axis 212 and Y-axis relating to an upper-left corner of the source image 210. Furthermore, variables w and h can represent width and height of rectangle (R) inside the source image 210. This notation allows rectangle (R) position and size to be represented as follows:

$$v_1 = [x0_1, y0_1, w_1, h_1]^T$$

$$v_2 = [x0_2, y0_2, w_2, h_2]^T$$

During a motion from the start rectangle position 216 and end rectangle position 218, a duration can be represented by time d seconds with a video frame rate of f frames per second. The number of video frames for motion is n=f×d. Unlike traditional video, image-based video only requires a source image to be encoded. Frames of video are defined as a position and size of start rectangle position 216 to the end rectangle position 218. The position and size of the rectangle within the image 210 in relation to frame i can be calculated as follows:

$$v_i = v_1 + \frac{i}{n}(v_2 - v_1)$$

Although an image to be encoded may not be the full source image 210 since the start and end motion may not include the entire source image 210, a union 226 of the start position rectangle 216 and the end position rectangle 218 is encoded and stored. It is appreciated the entire union image is to be stored. Furthermore, the image to encode is scaled down without losing fidelity based at least in part upon video size and smallest size of a motion from start rectangle position 216 and end rectangle position 218.

The system 200 fails to achieve performance goals when a motion from start rectangle position 216 and end rectangle position 218 is of substantial proportions. For example, a source image can be 2560×1920 pixels (e.g., a typical 5 MegaPixel digital image). When the motion is a zoom starting from the full source image to a 320×240 rectangle in the middle of the source image, and a video size of 320×240 is used, the full image size of 2560×1920 must be encoded. Thus, a substantial amount of time and CPU (e.g., processor) time is necessary to decode the image, and to generate each video frame of size 320×240 through appropriate resizing of the source image.

Figure 3:
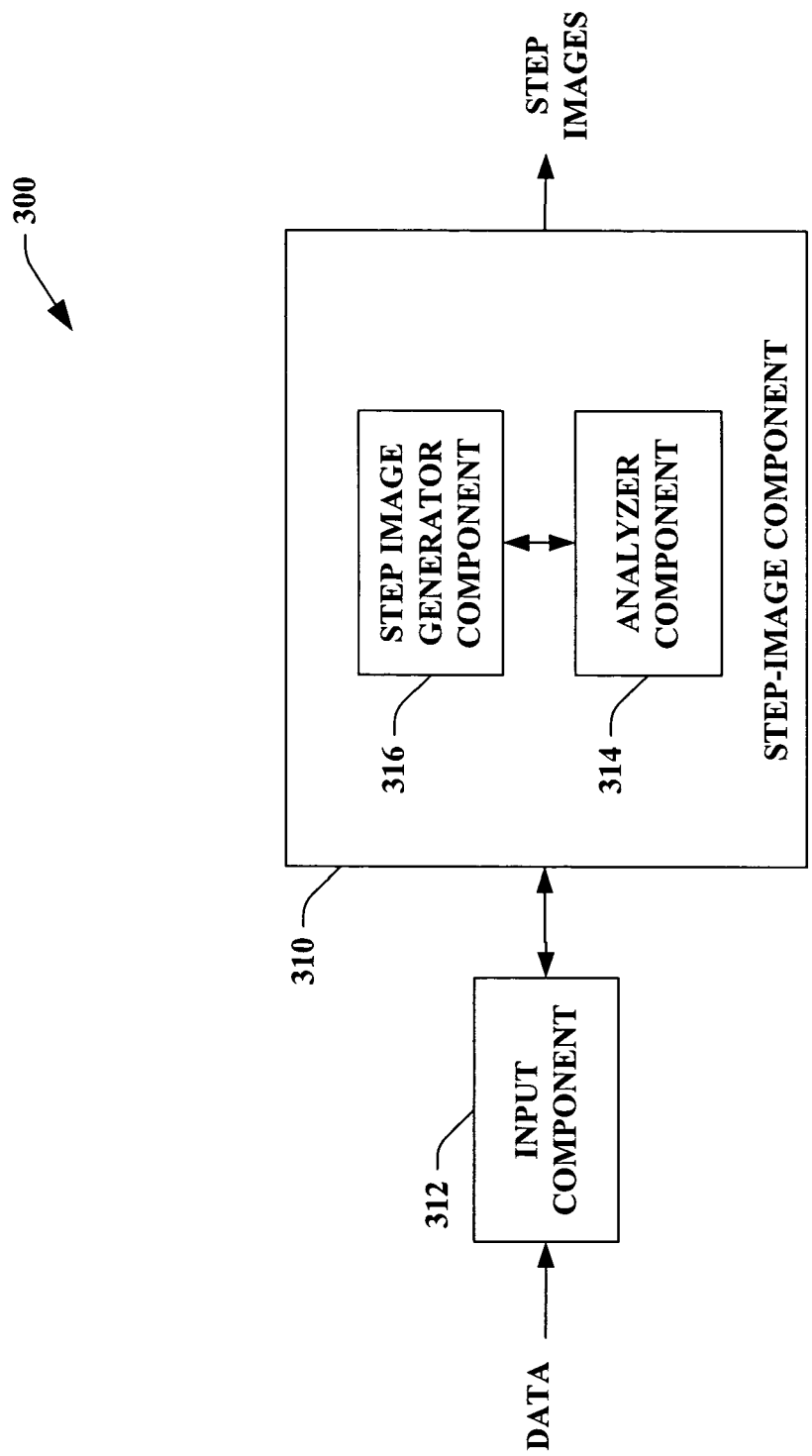
FIG. 3 illustrates a block diagram of an exemplary system that facilitates storing image-based video in accordance with an aspect of the subject invention.

Now turning to FIG. 3, a system 300 is illustrated comprising a step image component 310 that facilitates encoding a source image associated with a motion vector by employing at least one step image, wherein such step image provides a reduction in stored video. An input component 312 receives data such as a motion parameter and/or a computer environment parameter, wherein such step image component 310 creates a step image. The step image component 310 further comprises an analyzer component 314 that determines a maximum step image size of a step image and a number of step images to be utilized to encode a source image. In one aspect in accordance with the subject invention, the analyzer component 314 can define a threshold for maximum step image size based at least in part upon CPU (e.g., processor) capability and frame rate such that there is sufficient CPU (e.g., processor) processing time to decode a step image and to render video frames. Although the maximum step image size can be defined as a threshold, the subject invention is not limited to such technique. Rather, the analyzer component 314 determines a maximum step image size such that sufficient time for a CPU (e.g., processor) is allocated to decode and render a smooth motion to a user.

Moreover, the analyzer component 314 computes a number of step images based in part upon a maximum step image size. For example, a number of step images can be calculated by defining the aspect ratio of the image frame as being substantially similar to an aspect ratio of the video. The analyzer component 314 can define a step factor(s), for a zooming motion with a maximum step image size ($w_{max}^{step}, h_{max}^{step}$) as follows:

$$s_z = \frac{w_{max}^{step}}{w_v}$$

With $w_{max}^{step}$ being a maximum width of a step image and $w_v$ is a video width. Similarly, the step factor can be calculated by the analyzer component 312 for a panning motion as follows:

$$s_p w_{max}^{step} = w_v$$

Upon calculation of a step factor, the analyzer component 314 determines a number of step images for the video size. For a zoom-out motion from a motion rectangle R1 to a motion rectangle R2, the number of step images $n_z$, is calculated by the analyzer component 314 as follows:

$$s_z^{n_z} \geq \frac{w_{R_2}}{w_{R_1}}$$

$$n_z = \text{ceil}\left(\frac{\ln(w_{R_2}/w_{R_1})}{\ln s_z}\right)$$

Where $W_{R_1}$ and $W_{R_2}$ define a width of the motion rectangles R1 and R2, respectively. Moreover, the analyzer component 314 handles zoom-in similarly by switching starting and ending motion rectangles as in the following equations:

$$s_z^{n_z} \geq \frac{w_{R_1}}{w_{R_2}}$$

$$n_z = \text{ceil}\left(\frac{\ln(w_{R_1}/w_{R_2})}{\ln s_z}\right)$$

When a motion is horizontal panning from rectangle R1 to rectangle R2, a number of step image $n_p$ is calculated by the analyzer component 314 as follows.

$$n_p s_p = |X_{R_2} - X_{R_1}|$$

$$n_p = \text{ceil}\left(\frac{|X_{R_2} - X_{R_1}|}{s_p}\right)$$

$X_{R_1}$ and $X_{R_2}$ represent an X coordinate of an upper-left corner of R1 and R2, respectively. Similarly, a Y coordinate of an upper-left corner of R1 and R2 is used by the analyzer component 314 when a panning motion is vertical as follows:

$$n_p s_p = |Y_{R_2} - Y_{R_1}|$$

$$n_p = \text{ceil}\left(\frac{|Y_{R_2} - Y_{R_1}|}{s_p}\right)$$

Furthermore, the analyzer component 314 can determine a number of step image n when a motion is both a zoom and pan by utilizing the following:

n=max(n_z,n_p)

Once a maximum step image size of step images and number of steps for a motion are determined by the analyzer component 314, the step image generator component 316 creates step images related to a motion. In other words, the determined number of step images is created for a motion (e.g., zoom, pan, or pan and zoom). The step image generator component 316 provides a parsing of a substantial motion into smaller motions with step images which are stored into video rather than storing a substantial portion of a source image and corresponding motion vectors.

In one aspect in accordance with the subject invention, the step image generator component 316 can locate a starting and ending motion rectangle within an associated step, obtain a union rectangle, scale the union rectangle down, and calculate a starting and ending motion rectangles of a scaled down union rectangle in order to create a step image. It is to be appreciated that floating point of double precision is utilized by the step image generator component 316 avoiding complications caused by round-off error. For example, the step image generator component 316 computes Ris defining such as a portion of an image used to generate a first frame of video in the associated step. Similarly, the step image generator component 316 determines Rie to represent a portion of a source image used to generate a last frame of video in the associated step. Next, the step image generator component 316 provides a union rectangle, which is scaled down to an effect where fidelity is not affected. The scale down factor can be determined by the step image generator component 316, for example, as follows:

f=min(W_Ris, W_Rie)/Wvideo

Where $W_{Ris}$ is a width of a starting motion rectangle Ris, $W_{Rie}$ is a width of an ending motion rectangle Rie, and Wvideo is a width of video to be rendered. This scale down factor can be applied by the step image generator component 316 toward an extracted union region of Ris and Rie from the source image for each step. It is to be appreciated that a scaled down factor applied to a union region is to be rounded up to the nearest integer. Once a union rectangle is scaled, the step image generator component 316 calculates starting and ending motion rectangles within the scaled down step image. The step image generator component 316 can repeat the process to create step images based upon, for example, a number of step images determined by the analyzer component 314.

Figure 4:
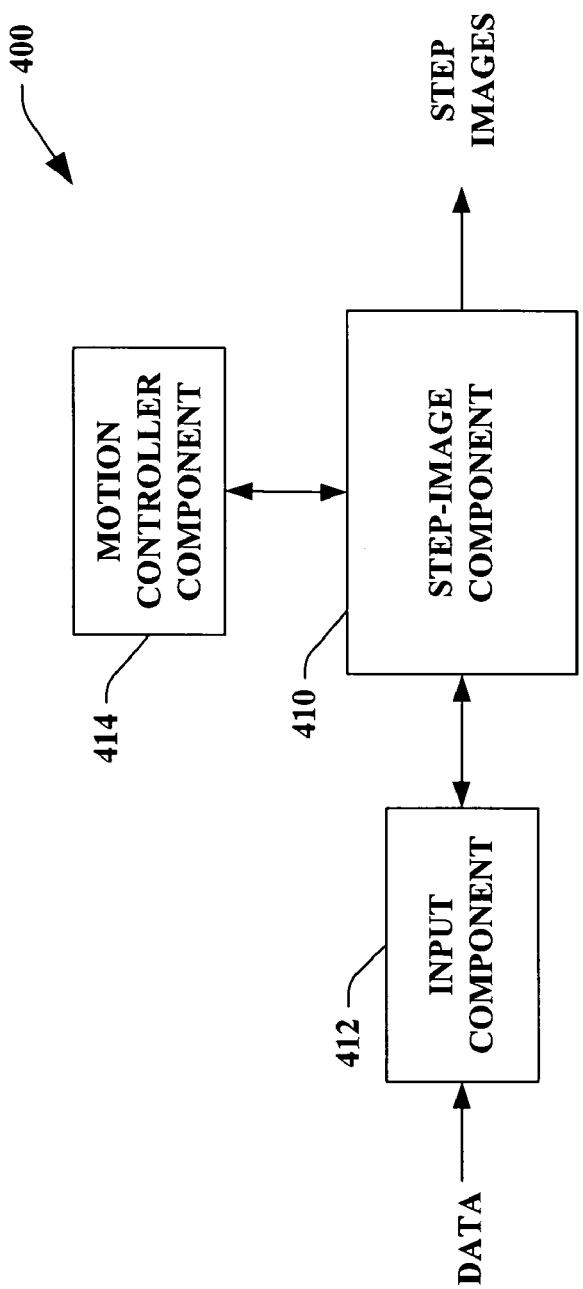
FIG. 4 illustrates a block diagram of an exemplary system that facilitates storing image-based video in accordance with an aspect of the subject invention.

Referring to FIG. 4, a system 400 is illustrated that facilitates encoding a source image associated with a motion vector by employing at least a step image, wherein such step image provides a reduction in the amount of stored video. The step image component 410 determines a size and number of step images and creates step images based upon an input component 412. The input component 412 can receive data such as, but not limited to a motion (e.g., pan, zoom, pan and zoom, . . . ) and a computer environment characteristic. System 400 further comprises a motion controller component 414 mitigating video visual perception during a substantial zoom motion and/or substantial pan and zoom motion within image-based video. Conventional systems can be problematic based in part upon a video perception of acceleration and deceleration associated with a substantial motion. For example, a zoom-in from a source image to a small rectangular region inside such source image, motion perceives to start slowly and accelerate toward the end. In yet another example, a zoom-in motion from a rectangle size of 4000×3000 pixels to a rectangle of size 400×300 pixels is depicted. Based on a linear motion occurring over a period of 100 frames of video, a width of the rectangle reduces by (4000−400)/100=36 pixels. Correspondingly, a height of the rectangle reduces by (3000−300)/100=27 pixels. At the beginning of zoom-in when viewing a video size of 4000×3000 pixels, a motion of 36×27 pixels appears relatively slow. With each frame, only 36/4000*100=0.9% of the picture has moved out—leading the user to perceive motion zooming slower on a display. However, at the end of zoom-in when viewing a portion of video with size of approximately 480× 360 pixels, the motion of 36×27 pixels appears relatively larger. With each frame at the end of zoom-in, 36/480*100=7.5% of the picture has moved out-leading the user to perceive motion zooming slower on a display.

The motion controller component 414 utilizes a non-linear motion in order to mitigate a motion perception described above. Conventional systems utilize linear motion defining a delta of motion for each subsequent frame as follows:

$$\Delta m_i = \frac{(m_2 - m_1)}{n}$$

During substantial zooming motion, the motion controller component 414 achieves a perception of smooth motion by utilizing an absolute motion speed that is not constant. For example, the motion controller component 414 utilizes an absolute motion speed starting fast at first, and reduces with time for a zoom-in motion. Conversely, a zoom-out motion requires the motion control component 414 to adjust absolute motion speed to a slow speed at first, and increase with time.

In one aspect in accordance with the subject invention, the motion controller component 414 controls calculated motion speed as a quadratic function of time as follows:

W=a(t−b)²+c

Where W is a width of a motion rectangle R at time t within a motion and a, b, and c are constants. By taking derivatives of above equation with respect to time, a speed of the motion is W' and an acceleration of the motion is W" is calculated as follows respectively:

W'=2a(t−b)

W"=2a

Using the above, the speed of motion W' changes linearly with respect to time and the acceleration of motion W" is constant. This gives a visual perception of smooth motion.

Figure 5:
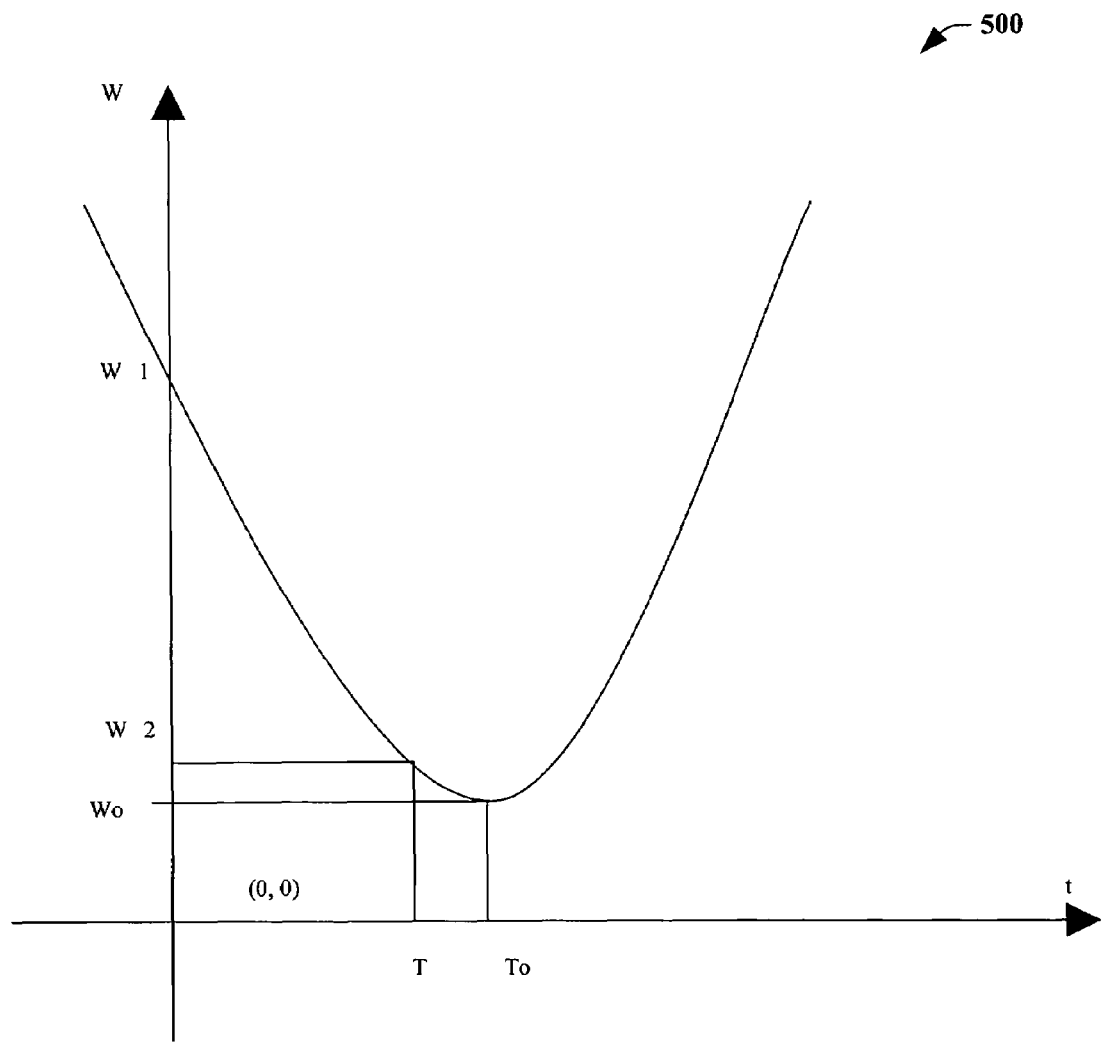
FIG. 5 illustrates a graph utilized to facilitate storing image-based video in accordance with an aspect of the subject invention.

Furthermore, the above equation relating to W (where W is the width of the motion rectangle R) can be represented by a graph illustrated in FIG. 5 from which motion controller 414 calculates the constants a, b, and c. With a rectangle motion zoom-in from time 0 to time T (e.g., the width of the motion rectangle decreases from W1 at time 0 to W2 at time T), two points on the curve follow the function with coordinates: (0, W1), (T, W2). Upon finding a third point on the curve, the motion controller component 414 uniquely determines parameters a, b, and c. In doing so, the motion controller component 414 utilizes a point (To, Wo) as shown in FIG. 5, where speed is zero and To can be assumed to be a factor of T. For example, To=1.25 T, which allows the motion controller component 414 to compute a zoom-in motion based on 3 points in the curve.

Figure 6:
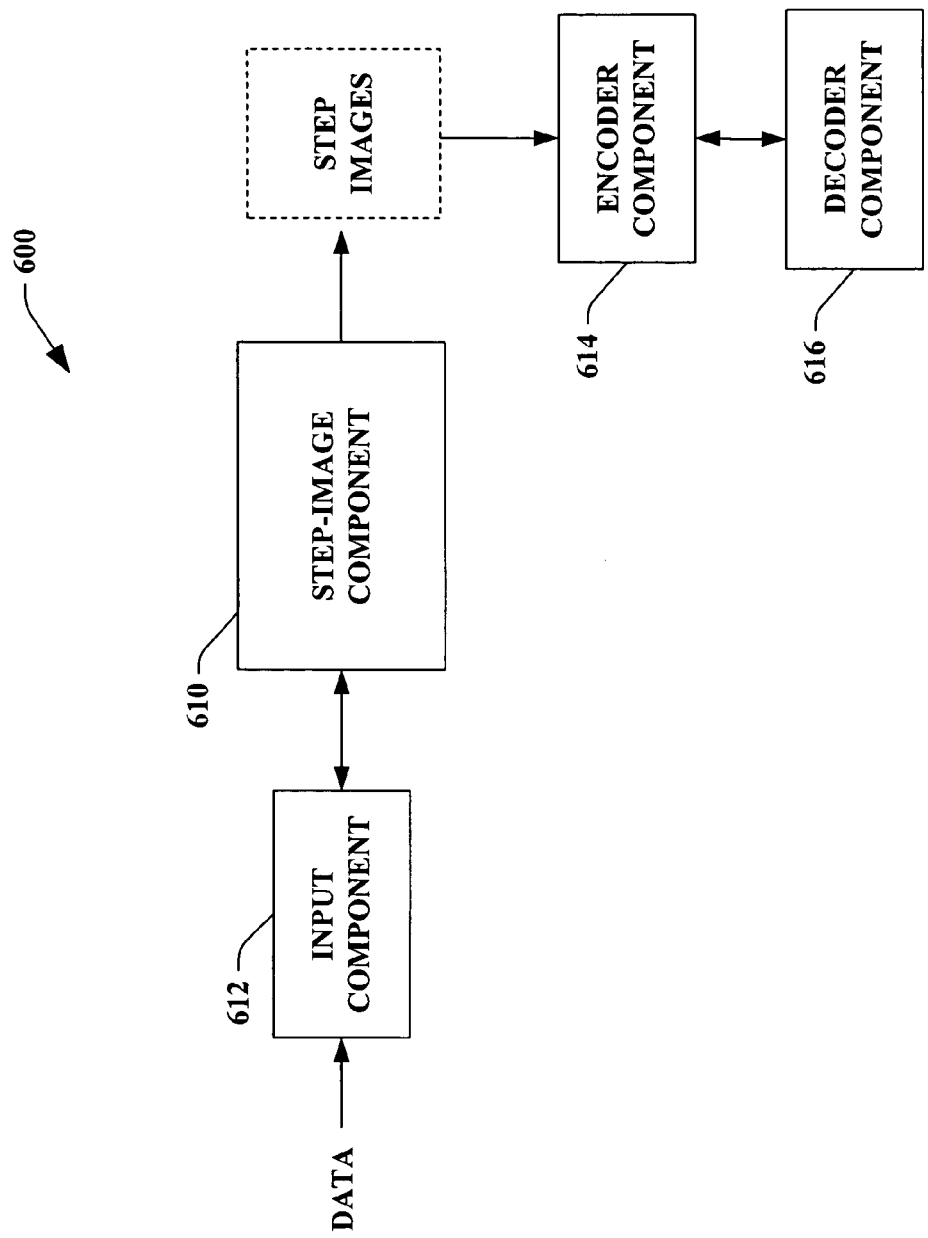
FIG. 6 illustrates a block diagram of an exemplary system that facilitates storing image-based video in accordance with an aspect of the subject invention.

Now turning to FIG. 6, a system 600 illustrates a step image component 610 that facilitates encoding a source image associated with a motion vector by employing a step image, wherein such step image provides a reduction in amount of stored video. The step image component 610 creates step images from a source image based upon an input component 612 that receives data, wherein such data can be, but not limited to being a motion parameter and/or a computer environment parameter. The step image component 610 can determine a number and size of step images based at least in part upon the motion parameter and/or the computer environment parameter, and create such step images.

The system 600 further includes an encoder component 614 that facilitates encoding of the step images created by the step image component 610. Conventional encoding techniques are not suited for the step image component 610. For example, rendering image-based video requires a decoder to decode a source image and motion information. Generally, conventional decoders maintain two image buffers, wherein a first buffer is used for current source image frame and a second is for previously used source image frame. If there is any transition to be applied between frames, such as a crossfade, it can be applied by using these two image buffers. By maintaining two images in buffers, the decoder is able to create transitions between subsequent images each having panning and/or zooming motion. Continuing with the example, source images $I_0, I_1, I_2, I_3, \ldots, I_n$ can be source images to be encoded. Using conventional techniques, images are encoded in the same order as displayed in video.

However, utilizing the step image component 610, the encoder component 614 and decoder component 616 employ special considerations for step images. For example, step images $S_1^0, S_1^1, S_1^2$ are step images of image $I_1$ and $S_2^0, S_2^1, S_2^2, S_2^3$ are step images of $I_2$ as follows:

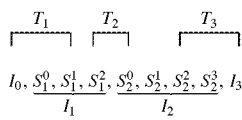

Where $T_1$, $T_2$ and $T_3$ are transitions between images $I_0$ and $I_1$, $I_1$ and $I_2$ and $I_2$ and respectively.

In one aspect in accordance with the subject invention, the encoder component 614 utilizes transition $T_1$ involving three images between two image pairs ($I_0$, $S_1^0$ and ($I_0$, $S_1^1$). As previously stated, traditional decoders maintain two image buffers. Thus, either $I_0$ or $S_1^0$ is discarded when $S_1^1$ is decoded. The encoder component 614 discards $S_1^0$ based at least in part upon subsequent output video frames generated by step images $I_0$ and $S_1^1$ (created by step image component 610). Under conventional encoding/decoding schemes, the decoder maintains only the last two decoded images in memory (e.g., $S_1^0$ and $S_1^0$). It is to be appreciated that in such cases, the encoder component 614 can determine an appropriate image to be cached by the decoder with a current frame and which image to be discarded when a new image is decoded.

In yet another aspect in accordance with the subject invention, the encoder component 614 utilizes transition $T_3$. Transition $T_3$ involves three images $S_2^2, S_2^3$ and $I_3$. The sequence is encoded by the encoder component 614 as $S_2^2$, $I_3$ and $S_2^3$ rather than $S_2^2$, $S_2^3$ and $I_3$. The encoder component 614 encodes images in this order based at least in part upon initial generation of video frames from source images $S_2^2$ and $I_3$ accordingly to produce transition $T_3$. Thus, video frames for the transition are generated initially from source images $S_2^2$ and $I_3$ and later from source images $I_3$ and $S_2^3$, accordingly the encoder component 614 correctly determines sequencing of images for appropriate playback.

Furthermore, the encoder component 614 sets a direction of transition to a newly encoded source image in which the decoder component 616 decodes accordingly. Continuing with the above, a direction of transition is $S_2^2$ to $I_3$ when $I_3$ is a newly decoded image—but the direction is from $S_2^3$ to $I_3$ when $S_2^3$ is the newly decoded image.

Figure 7:
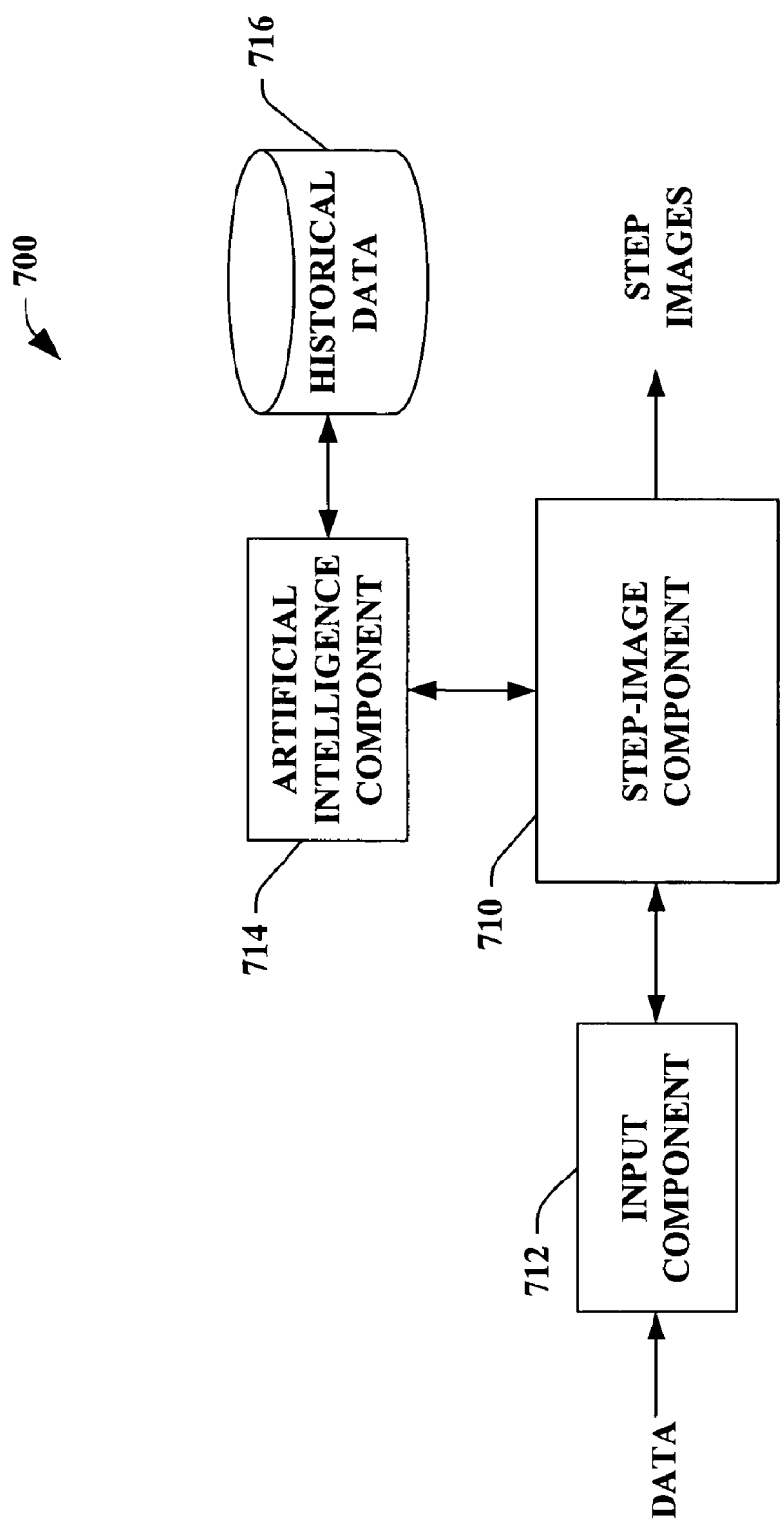
FIG. 7 illustrates a block diagram of an exemplary system that facilitates storing image-based video in accordance with an aspect of the subject invention.

FIG. 7 illustrates a system 700 in image-based video, including a step image component 710 that facilitates storing video by employing a step image based at least in part upon an input component 712 that receives data. The data can be, for example, a motion parameter and a computer environment parameter. For example, the motion parameter can be a pan, zoom, pan and zoom, and/or a source image utilized by a user within an image-based video. Additionally, the computer environment parameter can be, for example, a processor speed, a memory capacity, a display device, and an application version. The system 700 further comprises an artificial intelligence component 714 that infers a maximum step image size and/or a number of step image utilized by the step image component 710 based at least in part upon a historic data component 716. In one aspect in accordance with the subject invention, the historic data component 716 provides user profiles, source images, motions, . . . .

For example, the artificial intelligence component 714 utilizes a user profile of a user to employ a maximum step image size and number of steps for a motion request by such specified user. Based upon the historic data component 716, the artificial intelligence component can infer the maximum step image size and the number of steps. The user profile can be tailored to the specific user in which optimized step characteristics (e.g., maximum step size and number of step images) can be used based upon past characteristics (e.g., processor speed, memory capacity, display device, source image size, specific source image, motion requests, . . . ). Furthermore, the historic data component 716 can provide the step image component 710 with previous maximum step image size and number of steps based upon history of such user.

Figure 8:
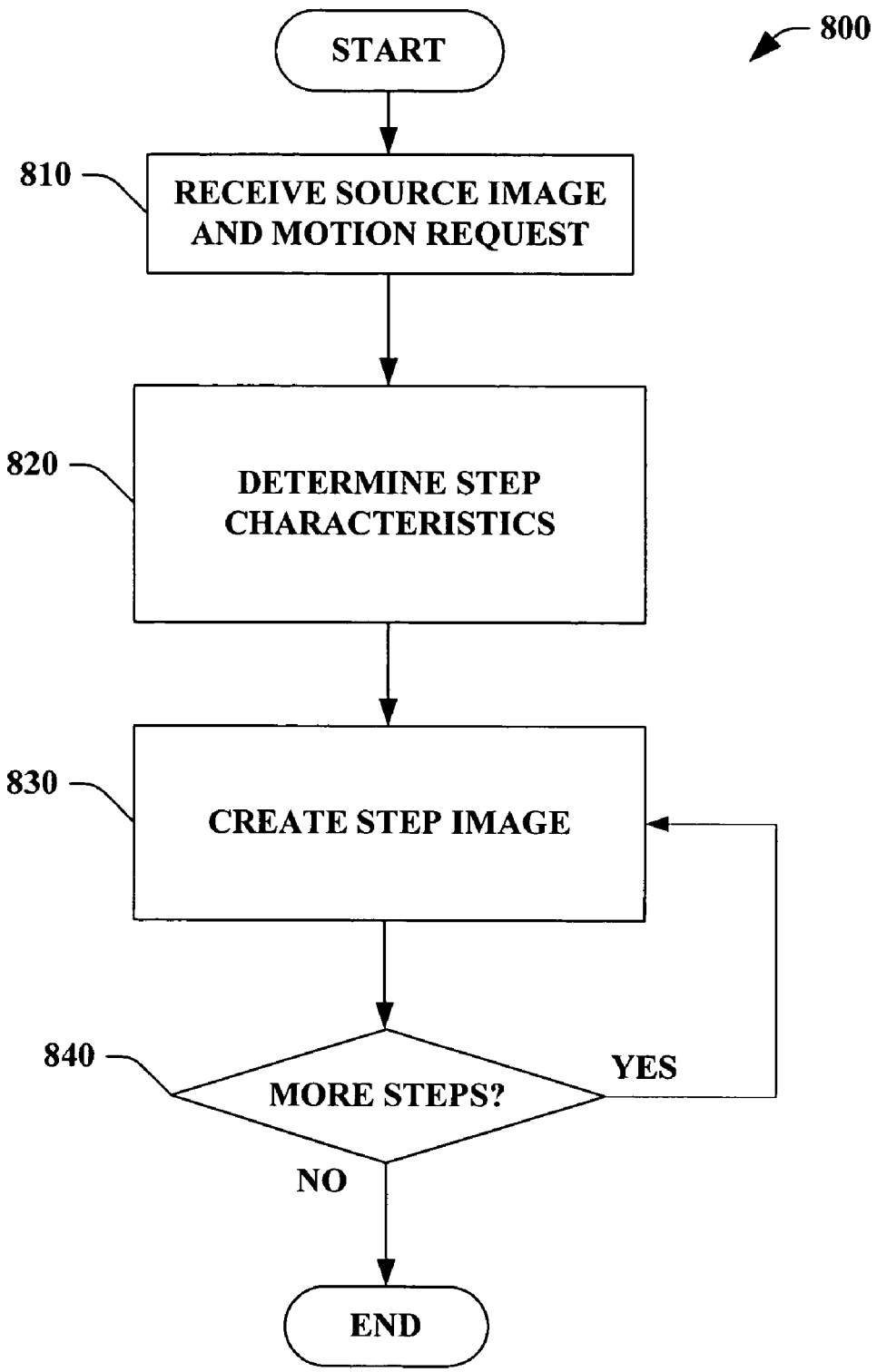
FIG. 8 illustrates an exemplary methodology that employs a step image technique that facilitates the storing of image-based video in accordance with an aspect of the subject invention.
Figure 9:
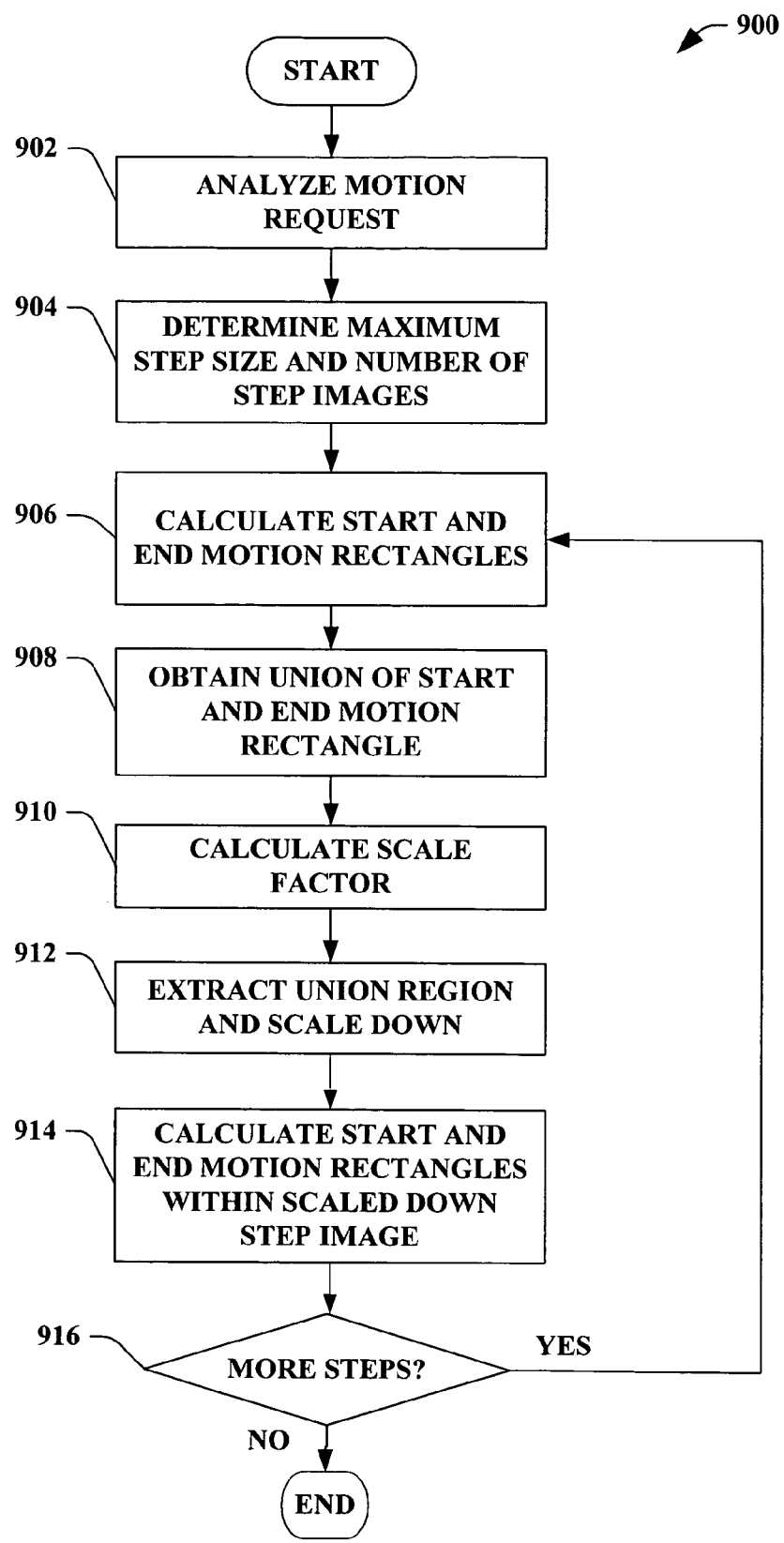
FIG. 9 illustrates an exemplary methodology that employs a step image technique that facilitates the storing of image-based video in accordance with an aspect of the subject invention.
Figure 10:
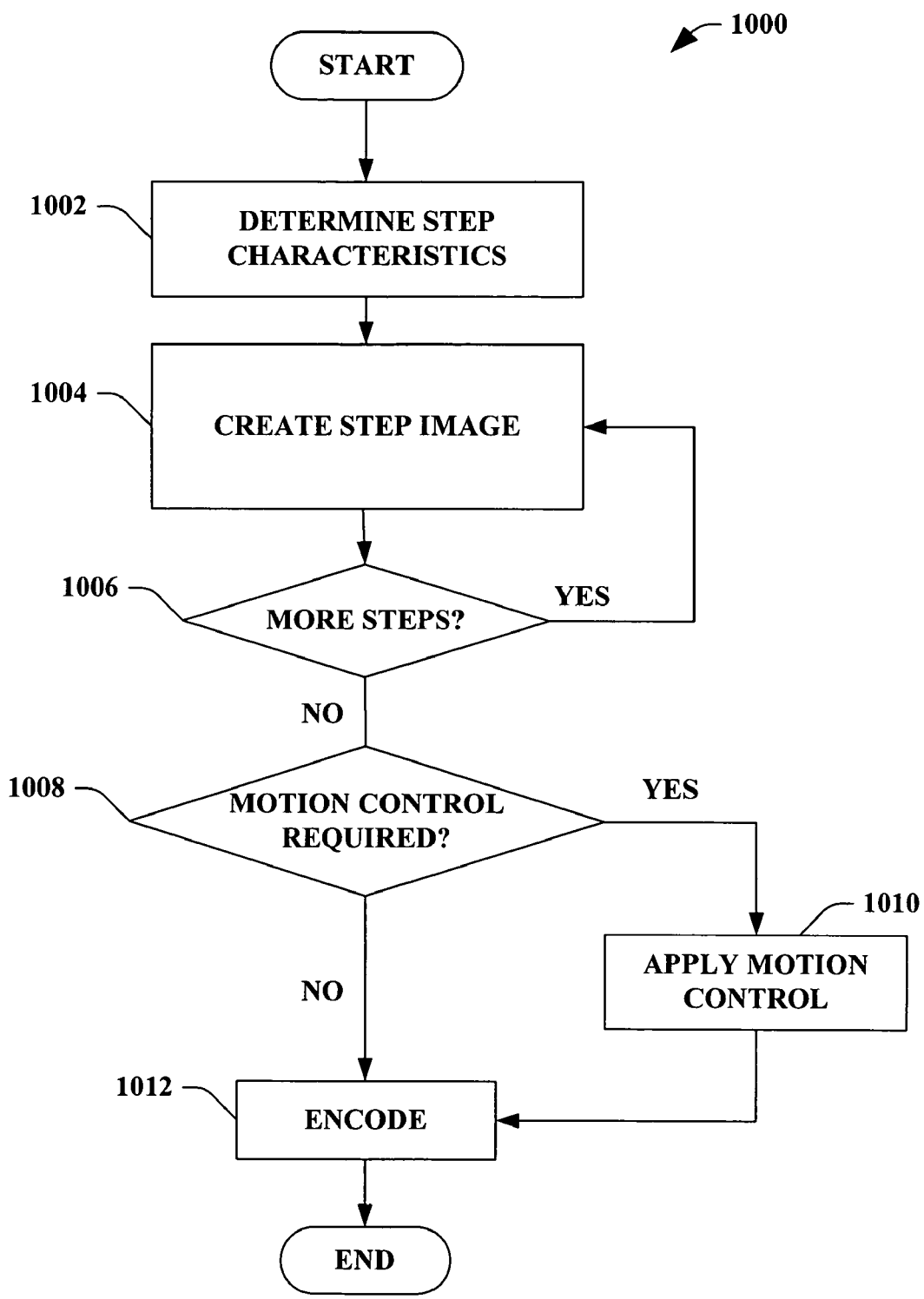
FIG. 10 illustrates an exemplary methodology that employs a step image technique that facilitates the storing of image-based video in accordance with an aspect of the subject invention.

FIGS. 8-10 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 8 illustrates a methodology 800 that facilitates storing of video in image-based video by employing at least one of a step image to a source image. At 810, a source image and a motion request are received. The motion request can be, but not limited to a pan, zoom, and/or pan and zoom within image-based video. Moreover, the source image can be, for example, the image for which a user would like to apply image-based video. At 820, step characteristics are determined. For example, step characteristics can be a maximum step image size and a number of step images for a given source image. In one aspect in accordance with the subject invention, a maximum step image size can be defined as a threshold, in which a number of step images can be determined by the equations stated supra for both a zoom and pan. Moreover, it is to be appreciated the step characteristics can be determined by at least one of a motion parameter and/or a computing environment parameter. For example, the motion parameter can be a zoom and/or pan over a source image, whereas the computing environment parameter can be a processor speed and/or a memory capacity. Next, at 830, step images are created based upon a maximum step image size and/or a number of steps and/or a motion requested by the user. Once the step image is created, methodology 800 determines if there are more step images to create at 840. If there are more step images to create, the method continues to 830. If there are no more steps to be created, all the step images are created and can be utilized in an encoding process.

FIG. 9 illustrates a methodology 900 that facilitates storing of video in an image-based video by employing at least one of a step image to a source image for encoding. At 902, a motion request by a user is analyzed. The motion request can be, for example, a zoom, pan, and/or pan and zoom within a creation, or alteration of an image-based video. Moreover, during the analyzing of the motion request, all relevant characteristics and data regarding a source image can be accumulated. Next, at 904, a maximum step image size and a number of step images can be determined. The determination at 904 can be based at least in part upon, but not limited to, a motion request, a source image characteristic, and/or a computer environment parameter. The computer environment parameter can be, for example, a processor speed, a memory capacity, a display device, a frame rate, a specified resolution, etc.

At 906, the method 900 starts the creation of step images. A calculation of start and end motion rectangles are computed for each number of step images for a motion. Next at 908, a union of start and end motion rectangles is computed. At 910, a scale factor is calculated such that fidelity of the step image is not deteriorated in relation to output video resolution. Then at 912, the scale factor is applied to the extracted union region. It is to be appreciated the result of calculation 912 is rounded up to the nearest integer so as not to lose precision. Next at 914, start and end motion rectangles within the scaled down image are calculated allowing the appropriate motion to be utilized with the step image. If at 916, there are more steps for which step images are to be created, the method continues at 906, otherwise, no more step images are created.

FIG. 10 illustrates a methodology 1000 that mitigates the motion and encoding complications when utilizing a substantial zoom and at least one step image. At 1002, step characteristics are determined. For example, the step characteristics such as maximum step image size and number of step images can be determined by a processor speed, a memory capacity, a video display, a source image size, a motion request, . . . . Once step characteristics are determined, step images can be created at 1004 utilizing techniques stated supra. At 1006, if there are more steps, the creation of step images continues at 1004. If there are no more steps to be created, the method continues to 1008. If the motion requested by a user requires motion control, the method proceeds to 1010. However, if no motion control is necessary, the method continues to 1012. For example, the motion control need only apply when there is a zoom related motion such as, but not limited to, zoom-in, zoom-out, pan X zoom-in, pan Y zoom-in, pan X zoom-out, pan Y zoom-out, (where X and Y are coordinate directions on the X-axis and Y-axis). At 1010, the appropriate motion control is applied. For example, motion control is based in part upon a motion requested and/or a non-linear quadratic function. After the motion control is applied, the step images are encoded accordingly at 1012. It is to be appreciated the encoding of the step images at 1012 works in conjunction with a decoder to ensure proper sequencing of the image-based video.

Figure 11:
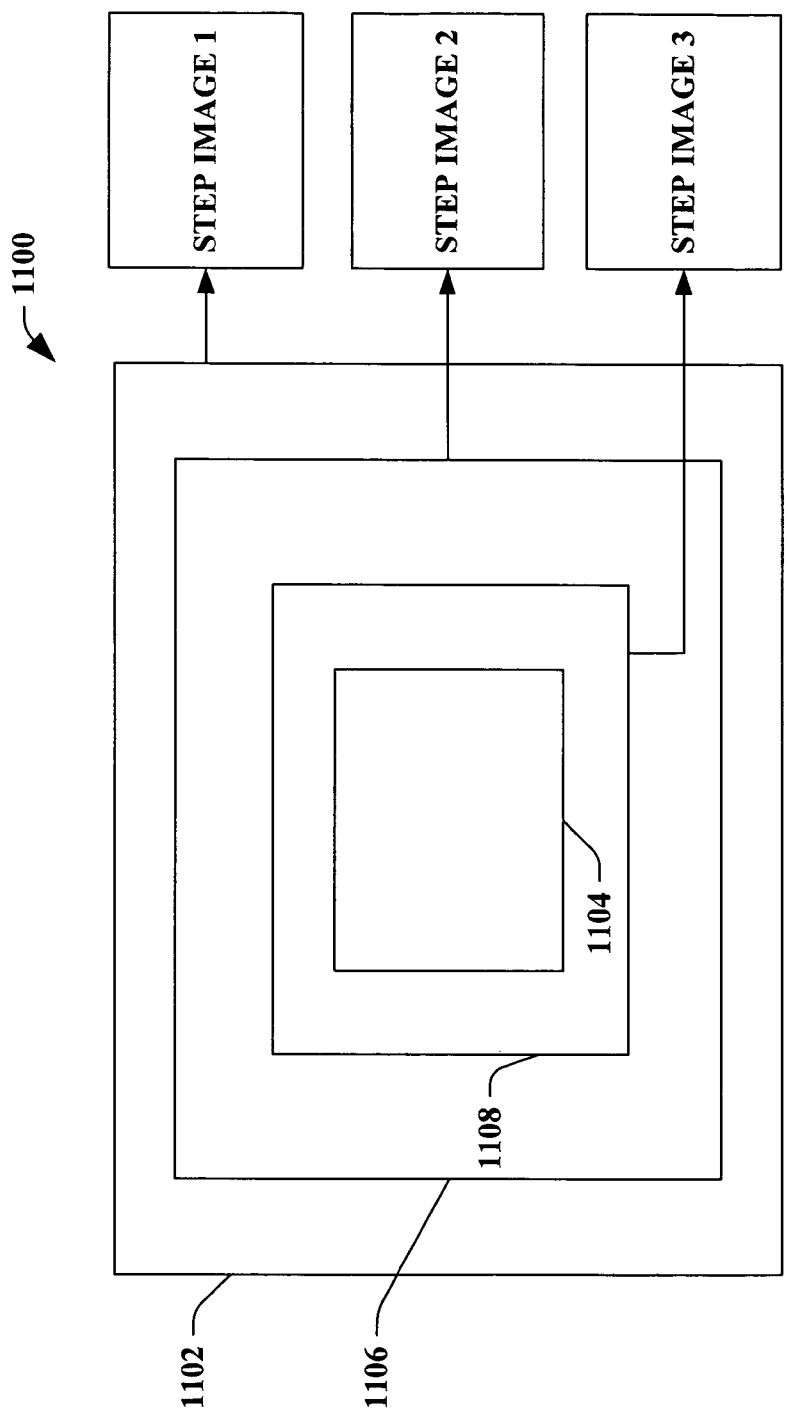
FIG. 11 illustrates an exemplary system that facilitates storing image-based video in accordance with an aspect of the subject invention.

Now turning to FIG. 11, an image-based video applying a zoom-in motion on a source image employing step images is illustrated. The motion from a start motion rectangle 1102 to an end motion rectangle 1104 is divided into 3 steps. Moreover, the motion from the start motion rectangle 1102 to the end motion rectangle 1104 takes n frames in video. It is to be appreciated that the number of steps used is for example and the determination of steps can be based at least in part upon the processor speed and/or memory capacity. A first intermediate rectangle (Ri) 1106 and a second intermediate rectangle (Rj) 1108 are intermediate positions at frame i and j such that $0<i<j<n$. In the first step, motion is from start motion rectangle 1102 to first intermediate rectangle (Ri) 1106. The second step of motion is from first intermediate rectangle (Ri) 1106 to second intermediate rectangle (Rj) 1108. In the third step, motion is from second intermediate rectangle (Rj) 1108 to end motion rectangle 1104.

In the first step of motion from start motion rectangle 1102 to first intermediate rectangle (Ri) 1106, a full image can be scaled to a smaller size such that first intermediate rectangle (Ri) 1106 has substantially similar resolution (or lower) as that of video to be generated. This scaled down image is Step Image 1. From Step Image 1, video frames for motion from start motion rectangle 1102 to first intermediate rectangle (Ri) 1106 are generated without losing video quality.

With the second step of motion from first intermediate rectangle (Ri) 1106 to second intermediate rectangle (Rj) 1108, a portion of image outside first intermediate rectangle (Ri) 1106 is not needed to generate video frames. The portion of the image to store is represented by first intermediate rectangle (Ri) 1106. Furthermore, the image to be stored can be scaled down such that the second intermediate rectangle (Rj) has substantially similar resolution (or lower) as that of the video to be generated. The scaled down portion of first intermediate rectangle (Ri) 1106 is Step Image 2, wherein video frames for associated motion from R1 to Rj can be generated without losing any video quality.

During the third step of motion from second intermediate rectangle (Rj) 1108 to end motion rectangle 1104, a portion of the image outside second intermediate rectangle (Rj) 1108 is not needed to generate video frames. Only a portion of the second intermediate rectangle (Rj) is stored. Additionally, the image that is stored can be scaled down such that second intermediate rectangle has substantially similar resolution (or lower) than the resolution of video to be generated. The scaled down image of second intermediate rectangle (Rj) 1108 is Step Image 3. From Step Image 3, video frames for motion between second intermediate rectangle (Rj) 1108 to end motion rectangle 1104 are generated without losing any video quality.

It is to be appreciated that storing of smaller step images (e.g., Step Image 1, Step Image 2, and Step Image 3) facilitates storing of video such that an entire source image need not be stored in order to generate image-based video with substantially similar quality. Moreover, the step images need not be substantially similar in size as the associated image (e.g., Step Image 1 need not be substantially similar in size as the image; Step Image 2 need not be substantially similar in size as the first intermediate rectangle (Ri) 1106; and Step Image 3 need not be substantially similar in size as the second intermediate rectangle (Rj) 1108).

Figure 12:
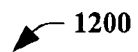
FIG. 12 illustrates a table with sizes of motion rectangles and step images in accordance with an aspect of the subject invention.

Referring to FIG. 12, sizes of motion rectangles and step images are depicted. Using step images can greatly reduce size of image frames. For example, a size of a source image can be 2560×1920, with zoom-in motion from the full image to a rectangle with a size of 320×240. With a video size of 320×240, the full source image is stored to generate video frames and maintain fidelity. However, when utilizing 6 steps and step images, with video size of 320×240, each step image is 452×339 pixels. Compared to storing an image of size 2560×1920 pixels (amounting to storing information about 2560×1920 pixels), information of the 6 step images of size 452×339 pixels is stored which amounts to storing 6×452× 339 pixels. By utilizing step images, the improvement in video storage is over 5 times.

Figure 13:
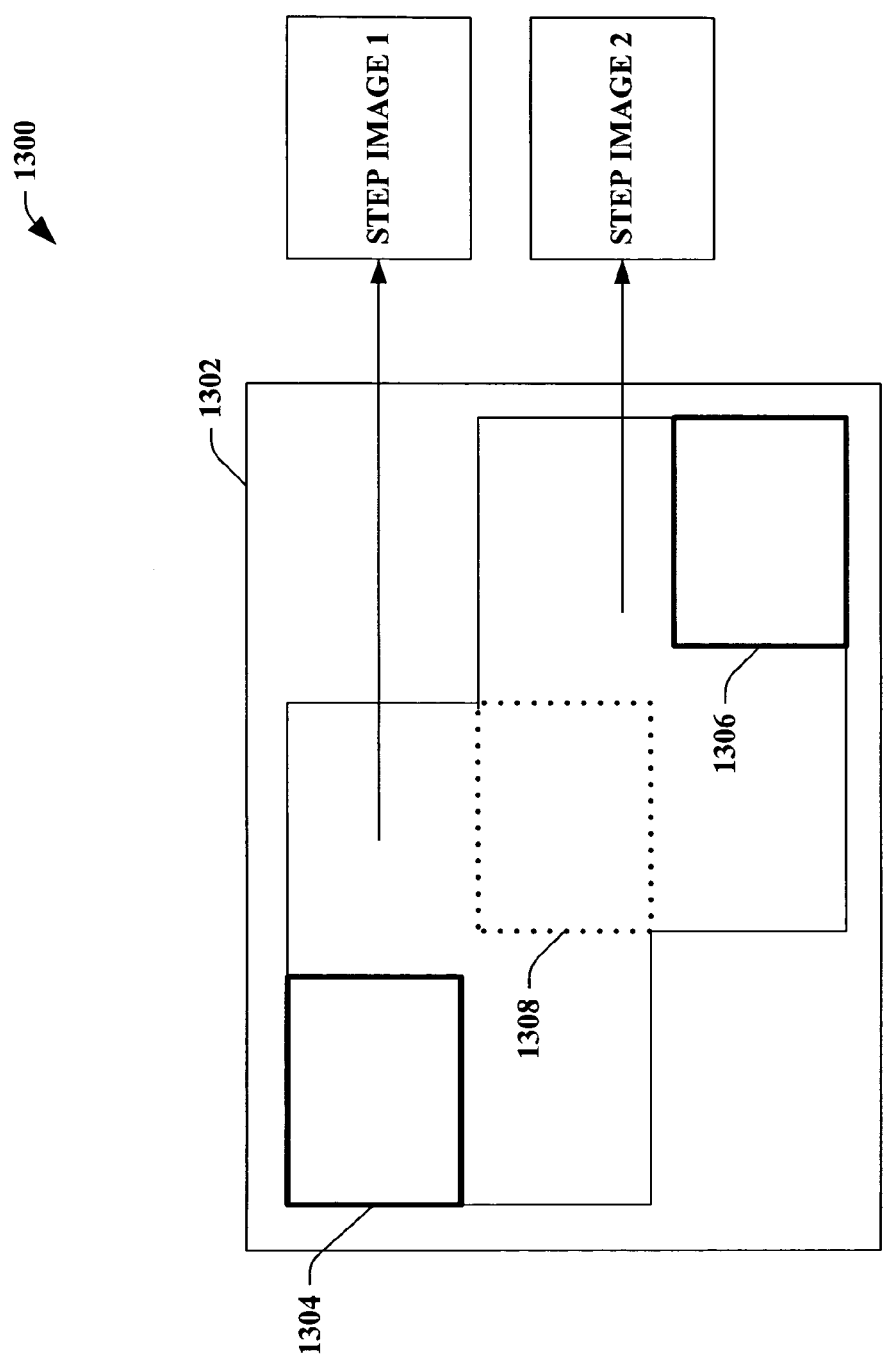
FIG. 13 illustrates an exemplary system that facilitates storing image-based video in accordance with an aspect of the subject invention.

FIG. 13 illustrates an image-based video applying a panning motion over a source image employing step images. A picture 1302 is panned from a start motion rectangle 1304 to an end motion rectangle 1306. Similar to the previous example, this motion occurs over a period of n frames of video. The motion from start rectangle motion 1304 to end motion rectangle 1306 is parsed into 2 steps, where a first intermediate rectangle (Ri) 1308 is an intermediate position at frame i such that 0<i<n.

The first stage of motion is from start motion rectangle 1304 to first intermediate rectangle 1308. A rectangular portion of an image—indicated by dotted lines—is calculated such that frames of video during the motion from start motion rectangle 1304 to first intermediate rectangle (Ri) 1308 can be generated from this portion. This rectangle is the union of rectangle 1304 and 1308. Thus, an associated portion of the image is stored in order to generate frames for this stage of motion. Moreover, the union rectangle is scaled down such that resolution of scaled down rectangle 1304 and 1308 is substantially similar as the resolution of output video. The scaled down union rectangle portion is Step Image 1.

The second stage of motion comprises from the first intermediate rectangle (Ri) 1308 to the end motion rectangle 1306. Similarly, the rectangular portion—indicated by dotted lines in FIG. 13 such that frame of video during this motion can be generated. This rectangle is the union rectangle of 1308 and 1306. After storing the portion of the image, a scale down is utilized such that the part corresponding to first intermediate rectangle (Ri) 1308 and end motion rectangle 1306 is of same resolution as output video. This scaled down union rectangle is Step Image 2. It is to be appreciated that storing Step Image 1 and Step Image 2 provides the minimum possible size without losing fidelity while the storage amount is reduced within image-based video.

Figure 14:
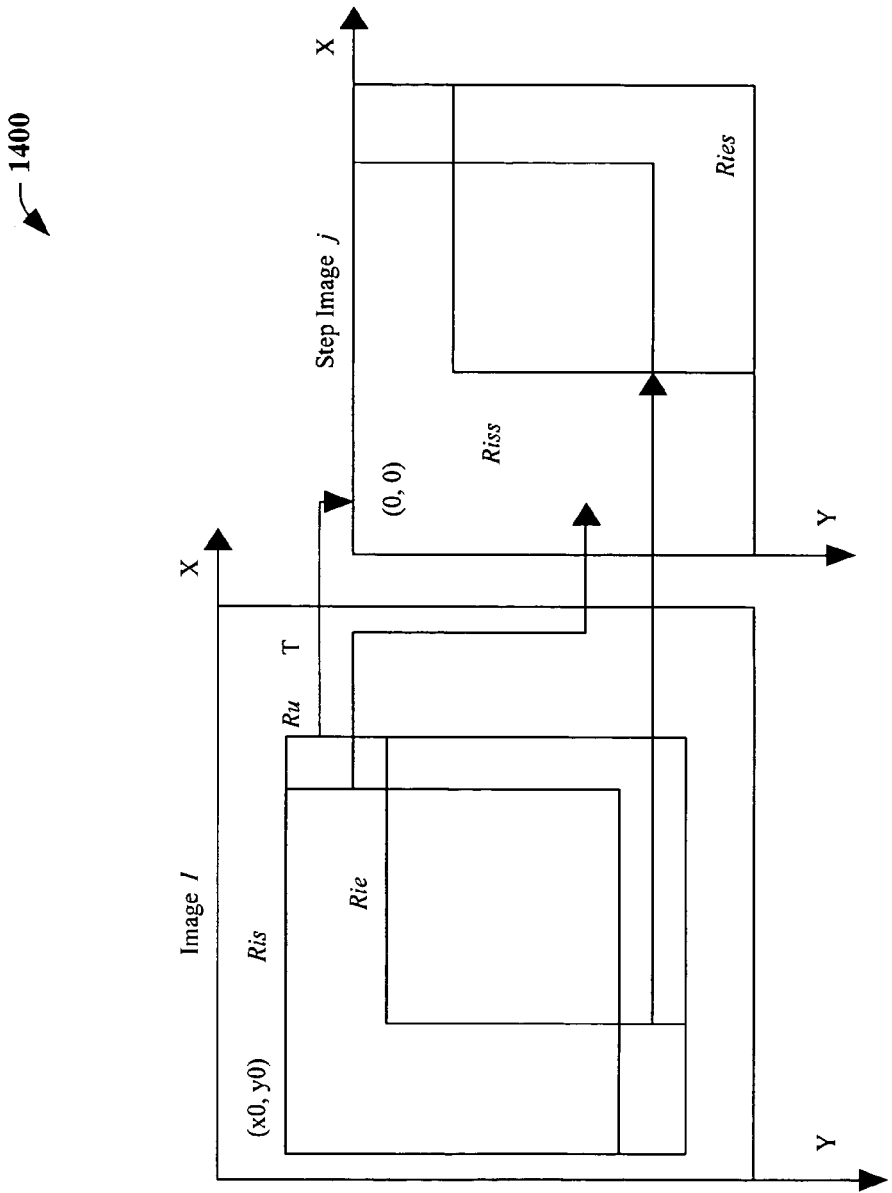
FIG. 14 illustrates an exemplary system that facilitates storing image-based video in accordance with an aspect of the subject invention.

Referring to FIG. 14, an exemplary calculation of step images is illustrated. After a size and a number of step image is calculated, step images can be generated from a source image for each step. A starting and ending motion rectangle within this step Ris and Rie are respectively calculated. Ris represents a portion of image used to generate a first frame of video in this step; Rie represents a portion of image used to generate a last frame of video in this step. A union of the rectangles Ris and Rie can be defined as Ru, wherein Ru is scaled down according to a pre-determined scale factor. After scaling, starting and ending motion rectangles Riss and Ries within the scaled image are calculated. It is to be appreciated a transformation T between step image and a union rectangle Ru in the source image are calculated first. While corresponding positions of starting and ending rectangles in the step image can be calculated by using T.

Figure 15:
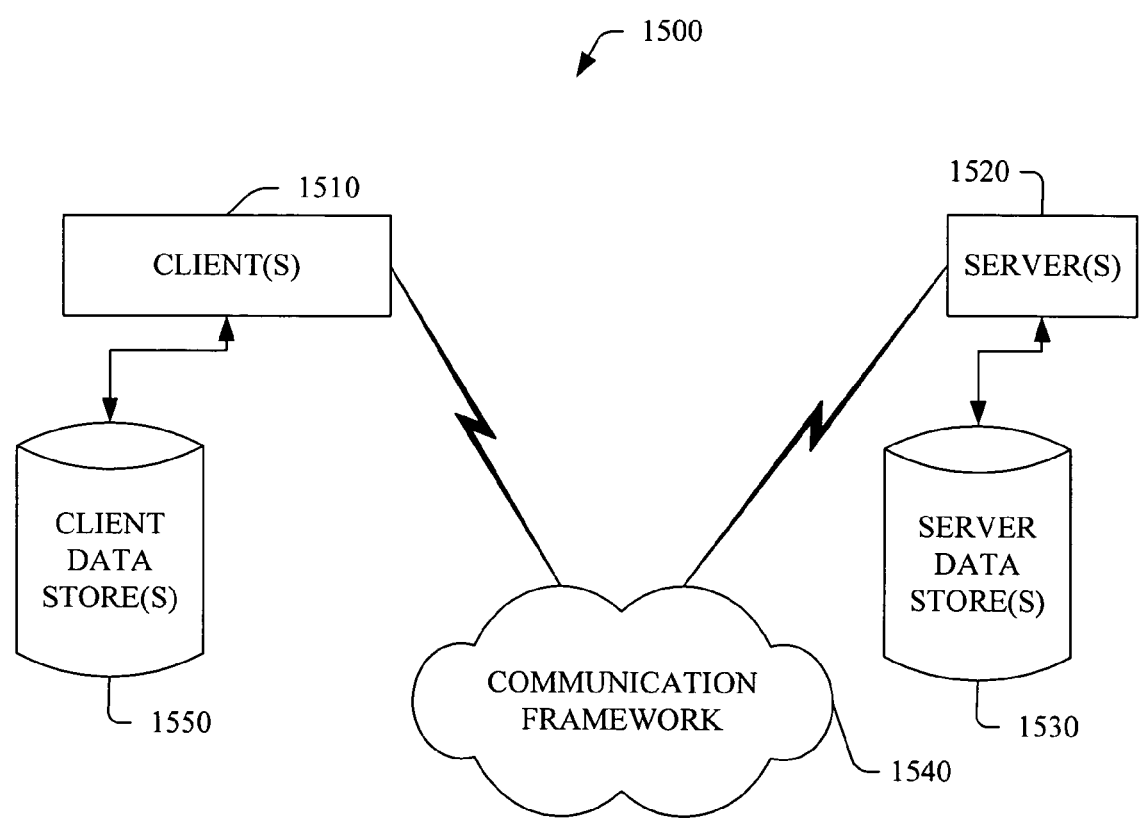
FIG. 15 illustrates an exemplary networking environment, wherein the novel aspects of the present invention can be employed.
Figure 16:
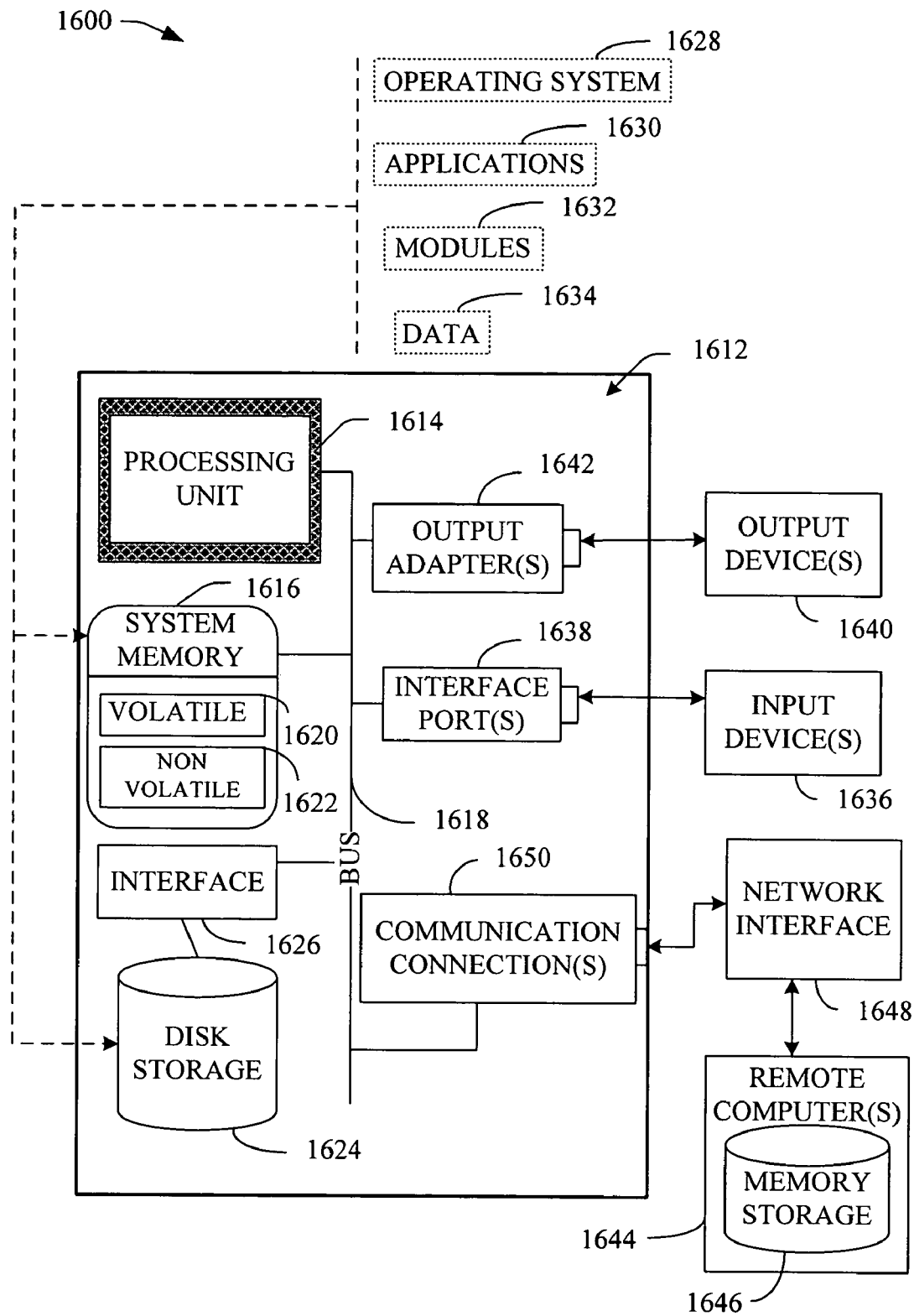
FIG. 16 illustrates an exemplary operating environment, wherein the novel aspects of the present invention can be employed.

In order to provide additional context for implementing various aspects of the present invention, FIG. 15-16 and the following discussion is intended to provide a brief, general description of a suitable computing environment in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 15 is a schematic block diagram of a sample-computing environment 1500 with which the subject invention can interact. The system 1500 includes one or more client(s) 1510. The client(s) 1510 can be hardware and/or software (e.g., threads, processes, computing devices). The system 1500 also includes one or more server(s) 1520. The server(s) 1520 can be hardware and/or software (e.g., threads, processes, computing devices). The servers 1520 can house threads to perform transformations by employing the subject invention, for example.

One possible communication between a client 1510 and a server 1520 can be in the form of a data packet adapted to be transmitted between two or more computer processes. The system 1500 includes a communication framework 1540 that can be employed to facilitate communications between the client(s) 1510 and the server(s) 1520. The client(s) 1510 are operably connected to one or more client data store(s) 1550 that can be employed to store information local to the client(s) 1510. Similarly, the server(s) 1520 are operably connected to one or more server data store(s) 1530 that can be employed to store information local to the servers 1540.

With reference to FIG. 16, an exemplary environment 1600 for implementing various aspects of the invention includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in the suitable operating environment 1600. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the subject invention can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapter 1642 is provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application.

Furthermore, to the extent that the terms "includes," and "including" and variants thereof are used in either the detailed description or the claims, these terms are intended to be inclusive in a manner similar to the term "comprising."

What is claimed is:

1. A system that facilitates storing video, comprising:
a component that receives a motion parameter and a computer environment parameter;
an analyzer component that determines a step characteristic associated with a source image and a motion request, wherein the motion request is a zoom-out; and
a step image component that determines a maximum step image size and a number of step images, based upon the motion parameter and the computer environment parameter, and creates corresponding step images based at least in part upon the step characteristic such that the video can be rendered using step images rather than the source image and still maintain full fidelity;
wherein the step characteristic is at least the maximum step image size and the number of step images, and the maximum step image size is defined as a threshold based at least in part upon desired video frame rate and processor capability; and
wherein the analyzer component determines the number of step images with $$n_z = \text{ceil}\left(\frac{\ln(w_{R_1}/w_{R_2})}{\ln s_z}\right);$$

wherein $n_z$ is a number of step images for a zoom-out, $w_{R_1}$ is a width of a motion rectangle R1, $w_{R_2}$ is a width of a motion rectangle R2, and $s_z$ is a step factor for a zoom motion defined as $$s_z = \frac{w_{max}^{step}}{w_v};$$

wherein $w_{max}^{step}$ is a maximum width of step image and $w_v$ is a video width.

2. The system of claim 1, wherein the computer environment parameter comprises at least one of a processor speed; a memory capacity; a frame rate; and a video display.

3. The system of claim 1, wherein the step image is encoded.

4. The system of claim 1 further comprises a motion controller component that mitigates video visual perception in a motion.

5. The motion controller component of claim 4 utilizes a non-linear absolute motion.

6. The motion controller of claim 5 computes the non-linear absolute motion via employment of a quadratic equation of the form:

$$W = a(t-b)^2 + c;$$

wherein W is a width of a motion rectangle, t=time, and, a, b, c are constants.

7. The system of claim 1 further comprises an encoder component that facilitates encoding of the step images.

8. The system of claim 7, the encoder component determines the appropriate image to be cached by the decoder with the current frame and which image is to be discarded and sets a direction of transition to a newly encoded source image which a decoder utilizes.

9. The system of claim 7, the encoder component encodes images in order upon the initial generation of a video frame from a source image and sets a direction of transition to a newly encoded source image in which a decoder utilizes.

10. The system of claim 1 further comprises an artificial intelligence component that infers at least one of a maximum step image size and a number of the image step based at least in part upon historical data.

11. A system that facilitates storing video, comprising:
an analyzer component that determines a step characteristic associated with a source image and a motion request, wherein the motion request is a zoom-in; and
a step image generator component that creates a step image based at least in part upon the step characteristic;
wherein the step characteristic is at least a maximum step image size and a number of step images, and the maximum step image size is defined as a threshold based at least in part upon desired video frame rate and processor capability; and
wherein the analyzer component determines the number of step images with $$n_z = \text{ceil}\left(\frac{\ln(w_{R_1}/w_{R_2})}{\ln s_z}\right);$$

wherein $n_z$ is a number of step images for a zoom-in, $w_{R_1}$ is a width of a motion rectangle R1, $w_{R_2}$ is a width of a motion rectangle R2, and $s_z$ is a step factor for a zoom motion defined as $$s_z = \frac{w_{max}^{step}}{w_v};$$

wherein $w_{max}^{step}$ is a maximum width of step image and $w_v$ is a video width.

12. A computer-implemented method that facilitates storing video, comprising:
determining a step characteristic associated with a received source image and a motion request, wherein the motion request is a zoom-in;
creating a step image based at least in part upon the step characteristic, wherein the step characteristic is at least a maximum step image size and a number of step images, and the maximum step image size is defined as a threshold based at least in part upon desired video frame rate and processor capability; and
determining the number of step images with $$n_z = \text{ceil}\left(\frac{\ln(w_{R_1}/w_{R_2})}{\ln s_z}\right);$$

wherein $n_z$ is a number of step images for a zoom-in, $w_{R_1}$ is a width of a motion rectangle R1, $w_{R_2}$ is a width of a motion rectangle R2, and $s_z$ is a step factor for a zoom motion defined as $$s_z = \frac{w_{max}^{step}}{w_v};$$

wherein $w_{max}^{step}$ is a maximum width of step image and $w_v$ is a video width.

13. The method of claim 12, further comprising:
applying a motion control based in part on the motion request; and
encoding the step image.

14. A computer-implemented method that facilitates storing video, comprising:
analyzing a motion request, wherein the motion request is a horizontal pan;
determining a step characteristic associated with a received source image and the motion request;
creating a step image based at least in part upon the step characteristic, wherein the step characteristic is at least a maximum step image size and a number of step image, and the maximum step image size is defined as a threshold based at least in part upon desired video frame rate and processor capability;
determining the number of step images with $$n_p = \text{ceil}\left(\frac{|X_{R_2} - X_{R_1}|}{s_p}\right);$$

wherein $n_p$ is a number of step images for a horizontal panning, $X_{R_2}$ is the X coordinate of the upper-left corner of a motion rectangle R2, $X_{R_1}$ is the X coordinate of the upper-left corner of a motion rectangle R1, $s_p$ is a step factor for a panning motion defined as $s_p = w_{max}^{step} - w_v$; wherein $w_{max}^{step}$ is a maximum width of step image and $w_v$ is a video width;
calculating a start motion rectangle and an end motion rectangle;
obtaining a union of the start and end motion rectangles;
computing a scale factor;
scaling the union of the start and end motion rectangles which creates a step image; and
calculating the start and end motion rectangles within the step image.

15. A computer readable medium encoded with a computer program, executable by a computer, that facilitates the storing of video, comprising: a component that receives at least a motion parameter and a computer environment parameter; an analyzer component that determines a step characteristic associated with a source image and a motion request, wherein the motion request is a pan and zoom; and a step image component that determines a step characteristics based at least in part upon the motion request and the computer environment parameter, and creates a step image; wherein the step characteristic is at least the maximum step image size and the number of step images, and the maximum step image size is defined as a threshold based at least in part upon desired video frame rate and processor capability; and wherein the analyzer component determines the number of step images with $n = \max(n_z, n_p)$; wherein n is a number of steps for a pan and zoom, $n_z$ is a number of steps for a zoom motion, $n_p$ is a number of steps for a panning motion.

16. The computer readable medium of claim 15, further comprising:
a motion controller component that mitigates video visual perception; and
an encoder component that encodes the step image.

17. A computer implemented system that facilitates storing video, comprising:
means for receiving a motion request and a source image;
means for determining a step characteristic associated with the received source image and the motion request, wherein the motion request is a vertical pan;
means for creating a step image based at least in part upon the step characteristic and the motion request, wherein the step characteristic is at least a maximum step image size and a number of step images, and the maximum step image size is defined as a threshold based at least in part upon desired video frame rate and processor capability;
means for determining the number of step images with $$n_p = \text{ceil}\left(\frac{|Y_{R_2} - Y_{R_1}|}{s_p}\right);$$

wherein $n_p$ is a number of step images for a vertical panning, $Y_{R_2}$ is the Y coordinate of the upper-left corner of a motion rectangle R2, $Y_{R_1}$ is the Y coordinate of the upper-left corner of a motion rectangle R1, $s_p$ is a step factor for a panning motion defined as $s_p = W_{max}^{step} - W_v$; wherein $W_{max}^{step}$ is a maximum width of step image and $W_v$ is a video width; and
means for encoding the step image.

* * * * *

UNITED STATES PATENT AND TRADEMARK OFFICE
CERTIFICATE OF CORRECTION

PATENT NO. : 7,400,351 B2  
APPLICATION NO. : 10/959385  
DATED : July 15, 2008  
INVENTOR(S) : Dongmei Zhang et al.

Page 1 of 1

It is certified that error appears in the above-identified patent and that said Letters Patent is hereby corrected as shown below:

In column 4, line 61, delete ""component, system,"" and insert -- "component," "system," --, therefor.

In column 11, line 52, after "$I_2$ and" insert -- $I_3$ --.

In column 20, line 28, in Claim 11, delete "$w_{r1}$" and insert -- $w_{R1}$ --, therefor.

Signed and Sealed this

Nineteenth Day of April, 2011

David J. Kappos  
*Director of the United States Patent and Trademark Office*